United States Patent [19]

Cooper et al.

[11] Patent Number: 4,585,982
[45] Date of Patent: Apr. 29, 1986

[54] THIRD HARMONIC AUXILIARY IMPULSE COMMUTATION INVERTER WITH MEANS FOR PRECHARGING COMMUTATION CAPACITOR

[75] Inventors: Charles E. Cooper; Thomas D. Stitt, both of Erie, Pa.

[73] Assignee: General Electric Company, Erie, Pa.

[21] Appl. No.: 679,980

[22] Filed: Dec. 10, 1984

[51] Int. Cl.⁴ .............................................. H02D 5/40
[52] U.S. Cl. .................................. 318/723; 318/722; 363/138
[58] Field of Search ............................... 363/135–138, 363/96; 318/722, 723

[56] References Cited

U.S. PATENT DOCUMENTS

| | | | |
|---|---|---|---|
| 3,725,770 | 4/1973 | Bailey . | |
| 3,852,657 | 12/1974 | Skogsholm et al. | 363/96 |
| 4,086,622 | 7/1978 | Vukasovic | 363/37 |
| 4,253,140 | 2/1981 | McMurray | 363/138 |
| 4,309,751 | 1/1982 | Okado | 363/138 |
| 4,403,280 | 9/1983 | Okado | 363/138 |
| 4,430,697 | 3/1984 | Steinbruegge et al. | 363/49 |

OTHER PUBLICATIONS

Steigerwald & Lipo, "Analysis of a Novel Forced-Commutation Starting Scheme for a Load-Commutated Synchronous Motor Drive", IEEE Trans., vol. IA-15, No. 1, Jan./Feb. 1979, pp. 14–24.

Primary Examiner—David Smith, Jr.
Attorney, Agent, or Firm—Albert S. Richardson, Jr.

[57] ABSTRACT

In a 3-phase third harmonic auxiliary impulse commutated electric power inverter the d-c terminals of which are connected, via a circuit having appreciable electrical inductance, to a voltage source comprising a battery, the commutation capacitor is precharged by cyclically manipulting the conducting periods of selected main and auxiliary valves of the inverter so that a series of discrete pulses of capacitor charging current flow from the battery through a path comprising the aforesaid circuit, part of the inverter load circuit, and the capacitor, with alternate pulses of current traversing the capacitor in one direction and intermediate pulses traversing it in the opposite direction. Such action continues for a sufficient number of cycles to "ring up" the capacitor to a voltage magnitude more than five times higher than the battery voltage.

19 Claims, 12 Drawing Figures

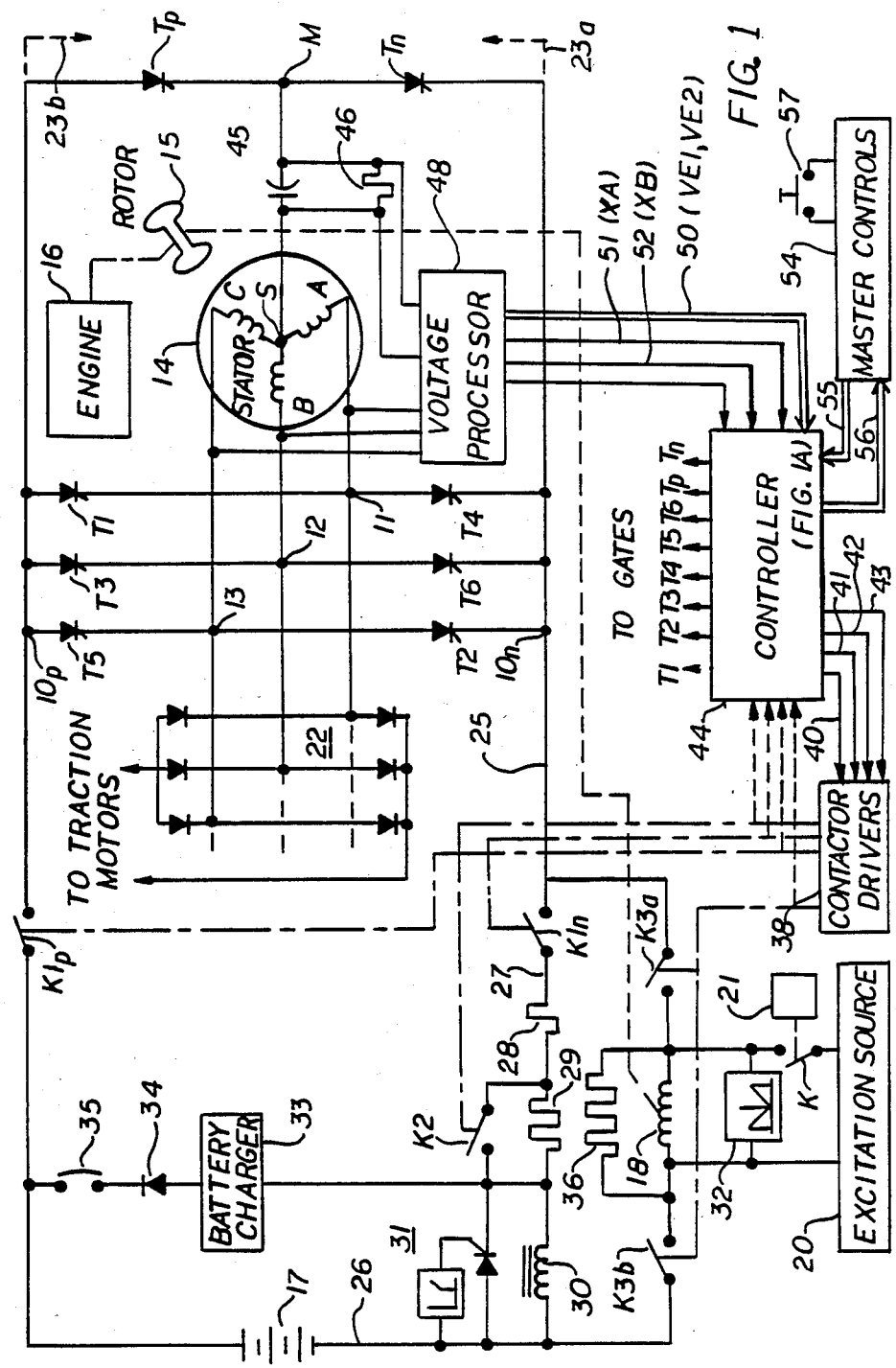

THIRD HARMONIC AUXILIARY IMPULSE COMMUTATION INVERTER WITH MEANS FOR PRECHARGING COMMUTATION CAPACITOR

CROSS REFERENCE TO RELATED APPLICATIONS

Certain features of the illustrated embodiment of this invention are the claimed subject matter of copending patent applications Ser. No. 680,102 and Ser. No. 678,979 which we filed concurrently herewith and assigned to General Electric Company.

BACKGROUND OF THE INVENTION

This invention relates to electric power inverters for converting direct current (d-c) to polyphase alternating current (a-c), and more particularly it relates to improvements in the old and well known current-fed "third harmonic" auxiliary impulse commutated inverters. The principles of commutation and a typical practical application of such inverters were described in a technical paper entitled: "Analysis of a Novel Forced-Commutation Starting Scheme for a Load-Commutated Synchronous Motor Drive," which paper was presented by R. L. Steigerwald and T. A. Lipo at the IEEE/IAS annual meeting held in Los Angeles, Calif. on Oct. 2–4, 1977. The Steigerwald and Lipo paper was reprinted in IEEE TRANS. Vol. IA-15, No. 1, January/February 1979, pgs. 14–24, and it is expressly incorporated herein by reference.

In essence, a third harmonic auxiliary impulse commutated inverter comprises six main unidirectional conduction controllable electric valves, such as thyristors, that are interconnected in pairs of series aiding, alternately conducting valves to form a conventional 3-phase, double-way, 6-pulse bridge between a pair of d-c terminals and a set of three a-c terminals. The d-c terminals of the bridge are adapted to be connected to a suitable source of relatively smooth direct current. A large, multicell, heavy duty electric storage battery is a suitable current source, as is the combination of an electric power rectifier to which an alternating voltage source is connected and a current smoothing reactor or choke in the d-c link between the d-c terminals of the rectifier and inverter, respectively. The a-c terminals of the aforesaid bridge are respectively connected to the different phases of a 3-phase electric load circuit which typically comprises star-connected 3-phase stator windings of a dynamoelectric machine such as a large synchronous motor.

To supply the load circuit with 3-phase alternating current, the six main valves of the inverter are cyclically turned on (i.e., rendered conductive) in a predetermined sequence in response to a family of "firing" signals (gate pulses) that are periodically generated in a prescribed pattern and at desired moments of time by associated control means. To periodically turn off the main valves by forced commutation, the inverter is provided with an auxiliary circuit comprising a precharged commutation capacitor and at least seventh and eighth alternately conducting unidirectional controllable electric valves that are arranged to connect the capacitor between the neutral or common point of the 3-phase a-c load circuit and either one of the d-c terminals of the bridge.

During each full cycle of steady state operation of a third harmonic inverter, each of the valves in the auxiliary commutation circuit is briefly turned on three separate times. More particularly, the 7th valve is fired at intervals of approximately 120 electrical degrees, and the 8th valve is fired at similar intervals that are staggered with respect to the intervals of the 7th valve, whereby one or the other auxiliary valve is fired every 60 electrical degrees. When an auxiliary valve is turned on, the commutation capacitor is effectively placed in parallel with one phase of the load circuit and a first one of the two main valves which are then conducting load current. Initially, the capacitor voltage magnitude is higher than the amplitude of the line-to-neutral voltage that is developed across the inductive load, and its polarity is such that the capacitor starts discharging. Consequently current is forced to transfer (commutate) from the first main valve (i.e., the offgoing or relieved valve) to a parallel path including the turned-on auxiliary valve and capacitor. The rate of change of current during commutation will be limited by the load inductance.

After current in the offgoing main valve decreases to zero, the magnitude of capacitor voltage is still sufficient to keep that valve reverse biased for longer than its "turn-off time." As soon as the commutation capacitor is fully discharged, load current begins recharging it with opposite polarity. Once the commutation capacitor is recharged to a voltage magnitude exceeding that of the line-to-neutral load voltage, the next (oncoming) main valve in the bridge is forward biased and can be turned on, whereupon load current commutates from the turned-on auxiliary valve and commutation capacitor to the oncoming main valve. This causes the auxiliary valve to turn off and completes the commutation process. The capacitor is left with voltage of proper polarity and sufficient peak magnitude for successful commutation of the second one of the first-mentioned two conducting main valves when the opposite auxiliary valve is turned on approximately 60 degrees later. It will be apparent that there are six intervals of commutation per cycle, the direction of current in the commutation capacitor during each interval is reversed compared to the preceding interval, and therefore the fundamental frequency of the alternating capacitor current equals the third harmonic component of load frequency.

For successful operation, a third harmonic auxiliary impulse commutated inverter needs to include suitable means for charging the commutation capacitor before normal operation commences. Heretofore, the capacitor has been precharged either through a resistor from an auxiliary power supply or, as suggested by Steigerwald and Lipo, by simultaneously turning on an auxiliary valve and an opposite one of the main valves to provide a path for capacitor charging current from the electric power source to which the d-c terminals of the inverter are connected. The latter path, which is a resonant circuit including the inductance of the reactor in the d-c link and the inductance of one phase of the load circuit in series with the capacitance of the commutation capacitor, will conduct a single pulse of current until the capacitor charges to a peak voltage approaching twice the magnitude of source voltage, whereupon the current falls to zero and both of the conducting valves are self commutated by the resonant circuit to their turned off (non-conducting) states. Once the third harmonic commutation mode of operation commences, the precharged capacitor can be "pumped up" to an even higher predetermined voltage level.

As is pointed out in the referenced Steigerwald and Lipo paper, one practical application of a current-fed third harmonic auxiliary commutated inverter is in an adjustable speed a-c drive system where the 3-phase star-connected stator windings of a rotatable synchronous machine are supplied with variable frequency a-c power by the inverter which needs to be forced commutated in order to start the machine. Such a machine can advantageously be used to start or "crank" a prime mover such as a large internal-combustion engine. For this purpose the rotor of the machine is coupled to a mechanical load comprising the crankshaft of the engine. Initially the output torque of the rotor (and hence the magnitude of current in the stator windings) needs to be relatively high in order to start turning the crankshaft. As the rotor accelerates from rest, less torque (and current) will be required, while the fundamental frequency of load current increases with speed (revolutions per minute). In its cranking mode of operation, the inverter supplies the machine with current of properly varying magnitude and frequency until the engine crankshaft is rotating at a rate that equals or exceeds the minimum speed at which normal running conditions of the engine can be sustained.

SUMMARY OF THE INVENTION

A general objective of the present invention is to provide a third harmonic auxiliary impulse commutated electric power inverter in which the commutation capacitor is precharged to a voltage magnitude that is higher than twice the source voltage by a technique that is relatively simple and inexpensive to implement.

Another objective is the provision, for such an inverter, of an improved capacitor precharging feature that enables a relatively small value of capacitance to be used.

In carrying out the invention in one form, a third harmonic auxiliary impulse commutated inverter has three a-c terminals respectively connected to different phases of a 3-phase a-c inductive load circuit, and a pair of d-c terminals that are connected, via an impedance having appreciable electrical inductance, to a source of direct voltage the average magnitude of which normally does not exceed a predetermined amount. The inverter comprises at least three pairs of alternately conducting main controllable electric valves arranged in a 3-phase, double-way, 6-pulse bridge configuration. For commutating the main valves, a commutation capacitor is connected between the load circuit and the juncture of two auxiliary controllable electric valves that are interconnected in series aiding fashion between the d-c terminals. Bistable voltage sensing means is coupled to the capacitor; it has a first state whenever the electrical potential on one side of the capacitor is measurably positive with respect to the other side, and otherwise it has a second state. The inverter also comprises control means for cyclically producing a family of periodic firing signals that cause the valves to turn on selectively.

In accordance with the present invention, the control means has a capacitor "ring-up" mode of operation that enables the commutation capacitor to be charged by the voltage source to a relatively high magnitude of voltage before normal operation in a third harmonic commutation mode commences. For this purpose the control means includes cyclically operative means coupled to the voltage sensing means and effective initially to generate either a first pair of concurrent firing signals for turning on a first one of the auxiliary valves and a preselected complementary one of the main valves if the sensing means is in the aforesaid first state, or a second pair of concurrent firing signals for turning on the second auxiliary valve and another preselected complementary one of the main valves if the sensing means is in its second state, whereupon in either case a pulse of direct current flows from the source through a path comprising the aforesaid impedance, the load circuit, and the capacitor. This current pulse is in a direction that will incrementally charge the capacitor with reverse polarity, and it soon oscillates to zero whereupon the conducting valves turn off. Thereafter, in delayed response to the start of the preceding cycle of operation, the cyclically operative means is effective repeatedly to generate the second pair of firing signals if the voltage sensing means is in its second state and the first pair if the sensing means is in its first state. This ring-up mode of operation continues for a sufficient number of cycles to enable the capacitor voltage to build up to a magnitude many times (e.g., at least approximately five times) higher than the aforesaid predetermined amount. The high voltage magnitude to which the capacitor is thus precharged permits a relatively small capacitor to be used without impairing successful commutating action once normal operation commences. Minimizing the size of the capacitor is desirable because a smaller capacitor can be procured at lower cost and because the resulting decrease in commutation time will correspondingly increase the maximum limit of the inverter's frequency range.

The invention will be better understood and its various objects and advantages will be more fully appreciated from the following description taken in conjunction with the accompanying drawings.

BRIEF DESCRIPTION OF THE DRAWINGS

FIG. 1 is a schematic diagram of a system comprising a rotatable electrical machine of the synchronous type having a rotor which is mechanically coupled to a variable speed prime mover and having 3-phase, star-connected stator windings which are connected to an electric storage battery via a plurality of controllable electric valves that in turn are interconnected and arranged to form a variable frequency third harmonic auxiliary impulse commutated inverter;

DESCRIPTION OF THE PREFERRED EMBODIMENT

Figure 1A:
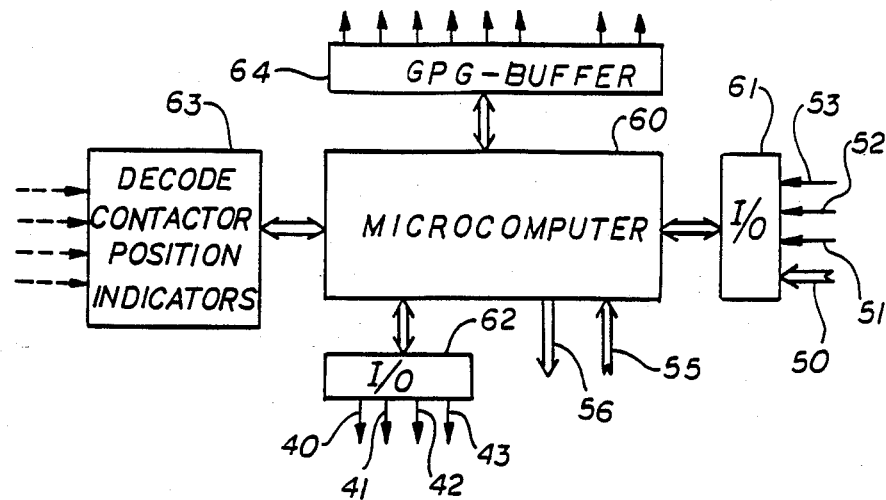
FIG. 1A is a simplified block diagram of the controller (shown as a single block in FIG. 1) which cyclically produces a family of periodic firing signals for respectively turning on the various valves of the inverter.

The electric power system shown in FIG. 1 comprises a third harmonic auxiliary impulse commutated inverter having a pair of d-c terminals 10p and 10n connected to a source of relatively smooth direct current and a set of three a-c terminals 11, 12, and 13 connected, respectively, to line terminals of three star-connected armature windings on the stator of a rotatable, variable speed, 3-phase a-c synchronous machine 14 which has a rotor 15 that is mechanically coupled to a prime mover 16. In the illustrated embodiment of the invention, the current source for the inverter comprises the combination of a source of voltage, such as a heavy duty electric storage battery 17, in series with impedance means which has appreciable electrical inductance, preferably provided by the d-c field winding 18 on the rotor 15 of the machine 14. By way of example, the battery 17 is a lead-acid or nickel-cadmium type having 32 cells and rated 68 volts, and the average magnitude of voltage at its terminals normally does not exceed 76 volts. Its internal resistance is typically in the range of 16 to 37 milliohms. The battery is intended to supply electric energy for starting the prime mover, and the system shown in FIG. 1 can successfully perform this function with the battery voltage as low as 61 volts.

The prime mover 16 can be a conventional thermal or internal-combustion engine, and in one particular application of the invention it is a high-horsepower, 16-cylinder diesel engine that is used to provide the motive power on a large self-propelled diesel-electric traction vehicle such as a locomotive. The synchronous machine 14 has dual modes of operation: as a generator for supplying alternating current to an electric load circuit that is connected to its stator windings, and as an a-c motor for cranking or starting the engine 16. In its generating mode, the rotor 15 of the machine is driven by the crankshaft of the engine 16, and the field winding 18 is energized by a suitable excitation source 20 (e.g., the rectified output of auxiliary windings on the stator of the machine 14) to which it is connected by means of a suitable contactor K which is closed by a conventional actuating mechanism 21 on command. The machine 14 now generates alternating voltages at the line terminals of its 3-phase stator windings. The rms magnitude of the fundamental sinusoidal components of these voltages depends on the angular velocity (rpm) of the rotor and on the amount of field excitation. The generated voltages are applied to a-c input terminals of at least one 3-phase, double-way rectifier bridge 22, and the rectified electric power at the output terminals of each such bridge is supplied via a d-c bus to one or more d-c traction motors (not shown). As is shown in FIG. 1, the bridge 22 comprises simple solid-state diodes, but alternatively it could be a controlled rectifier if desired. As is suggested by the broken lines 23a and 23b, an additional traction motor (not shown) could be connected between the d-c terminals 10p and 10n if desired.

In the motoring mode of operation, which is assumed throughout the remainder of this description, the rotor 15 of the synchronous machine 14 drives the crankshaft of the engine 16. Now electric energy is supplied from the battery 17 to the windings on both the rotor and the stator of the machine, and the rotor 15 exerts torque to turn the crankshaft and thereby crank the engine. As the rotor accelerates from rest, both the frequency and the rms magnitude of the fundamental alternating voltage waveforms developed at the line terminals of the stator windings (i.e., the back emf) correspondingly increase, while load current (i.e., current in the field and armature windings) decreases in magnitude. Once the rotor is rotating faster than a predetermined rate, which typically is 240 rpm, the engine is presumed to be started and the motoring mode (i.e., engine cranking mode) of operation is discontinued. Assuming that the machine 14 has ten poles, 240 rpm corresponds to a fundamental frequency of 20 Hertz. Thus the fundamental frequency of alternating current supplied to the stator windings of the machine 14 needs to increase from 0 to approximately 20 Hz in order for the illustrated system to perform its engine starting function.

The previously mentioned third harmonic auxiliary impulse commutated inverter is operative to convert direct current from the battery 17 into variable frequency alternating currents in the three different phases A, B, and C of the 3-phase armature windings on the stator of the machine 14. The inverter has at least three pairs of alternately conducting main controllable electric valves interconnected and arranged in a 3-phase, double-way bridge configuration between the set of three a-c terminals 11, 12, and 13 and the pair of d-c terminals 10p and 10n. More particularly: a first pair of valves T1 and T4 are connected in series aiding fashion from terminal 10p to terminal 10n, and their juncture, comprising terminal 11, is connected to phase A of the stator windings; a second pair of valves T3 and T6 are connected in series aiding fashion from 10p to 10n, and their juncture, comprising terminal 12, is connected to phase B of the stator windings; and a third pair of valves T5 and T2 are connected in series aiding fashion from 10p to 10n, and their juncture, comprising terminal 13, is connected to phase C. Each valve preferably comprises at least one solid state unidirectional controlled rectifier popularly known as a thyristor. It has a turned on (conducting) state and a turned off (non-conducting) state. In practice the valves are respectively shunted by conventional snubber circuits (not shown). The illustrated means for connecting the d-c terminals 10p and 10n of the inverter to the battery 17 will next be described in more detail.

The first d-c terminal 10p is connected to the relatively positive terminal of the battery 17 via a single pole contactor K1p, and the second d-c terminal 10n is connected to the other terminal of the battery by means of a conductor 25, one pole K3a of a double-pole contactor K3, the field winding 18, the other pole K3b of the same contactor, and a conductor 26. The field winding 18 typically has a resistance in the range of 0.12 to 0.28 ohm and an unsaturated inductance of more than 0.3 henry. A single-pole contactor K1n, a conductor 27, and resistance means comprising two resistors 28 and 29 are connected in parallel circuit relationship with the field winding 18 in the load current path between conductors 25 and 26. The resistors 28 and 29 are in series, and both have very low ohmic values; for example, the resistance of resistor 28 is approximately 14 milliohms and the resistance of resistor 29 is approximately 23 milliohms. The second resistor 29 is shunted by another single-pole contactor K2 which, when closed, reduces the ohmic value of the resistance means to that of the first resistor 28 alone.

An inductor 30 of approximately one millihenry inductance is connected in series with resistors 28 and 29 between the second resistor 29 and the conductor 26 to smooth the current flowing in this branch of the load current path. The inductor 30 is shunted by a conventional overvoltage protective device 31 the resistance of which is normally very high but automatically decreases to a negligible amount in substantially instantaneous response to the magnitude of voltage across the inductor rising to a predetermined breakover level (e.g., 750 volts). A similar protective device 32 with bidirectional response is connected across the field winding 18. A resistor 36 of significant ohmic value (e.g., 100 ohms) is also connected across the winding 18 to enable thyristor "latching" current to bypass the field and the inductor 30 when battery current starts flowing to precharge the inverter's commutation capacitor as will later be explained.

As is shown in FIG. 1, a battery charger 33, in series with a blocking diode 34 and a circuit breaker 35, is connected across the combination of battery 17 and inductor 30. With the engine 16 running under steady-state conditions, the battery charger holds the battery voltage at approximately 74 volts. It can be energized from any suitable source, such as auxiliary windings (not shown) on the stator of the synchronous machine 14.

With the field winding 18 in the load current path during engine cranking, the synchronous machine 14 will operate with a characteristic similar to that of a series d-c motor, namely, high current and hence desirably high starting torque at low speeds. The resistance means 28, 29 in parallel with the field reduces the ohmic value of resistance that the field winding alone would otherwise introduce in this path, thereby initially allowing a higher magnitude of armature current and later, as speed increases, providing automatic field weakening which permits the machine to run at a higher speed. Initially load current is limited by the internal resistance of the battery 17 as well as other resistance in its path, and as speed increases it is limited by the back emf of the armature (i.e., stator) windings. Thus load current and torque tend to decrease with increasing speed. A short time after cranking commences, the contactor K2 is closed to further reduce the amount of resistance in parallel with the field, thereby permitting more load current to flow and hence more torque to be developed at higher speeds compared to the quantities that would be achieved if the parallel resistance were not so reduced.

When the cranking mode of operation commences, the contactor K is open, and all of the contactors in the load current path between the battery 17 and the d-c terminals 10p and 10n are closed except K2. In a manner that will soon be explained, contactor K2 is commanded to close upon the expiration of a predetermined length of time after cranking commences. Thereafter, in response to the speed of the engine attaining a threshold (e.g., 240 rpm) that marks the conclusion of cranking and therefore the successful starting of the engine 16, all of the previously closed contactors are opened. Upon opening contactor K3 the field winding 18 is disconnected from the load current path between the conductors 25 and 26, and the contactor K is then closed by its actuating mechanism 21 in order to reconnect the field to the normal excitation source 20.

Each of the four contactors K1p, K1n, K2, and K3 has an associated actuating mechanism that determines its closed or open status. All four such mechanisms are represented in FIG. 1 by a single block 38 labeled "Contactor Drivers," and they respectively respond to opening/closing signals received over lines 40, 41, 42, and 43 from another block 44 labeled "Controller." The controller 44 knows the actual status of each contactor by virtue of feedback signals that it receives from conventional position indicators (not shown) that are associated with the separable contact members of the respective contactors, as represented symbolically by broken lines in FIG. 1.

In order to turn on each of the controllable valves T1 through T6 in the inverter, an appropriate signal is applied to the associated gate while the main electrodes of that valve are forward biased (i.e., anode potential is positive with respect to cathode). Such a signal is sometimes called a trigger or gating signal, and it is herein referred to generically as a "firing signal." In a manner soon to be described, the controller 44 cyclically produces a series of periodic firing signals for turning on the respective main valves T1–T6 in numerical order. (It is assumed that the alternating voltages developed at the line terminals of the 3-phase stator windings of the machine 14 have the conventional A-B-C phase rotation.) In order to quench or turn off each valve when desired, the inverter has a forced commutation circuit including at least first and second auxiliary controllable electric valves Tp and Tn interconnected in series aiding fashion between the d-c terminals 10p and 10n and connected via a commutation capacitor 45 to the stator windings of the machine 14. The capacitor 45 is shunted by a bleeder resistor 46 which effectively keeps the capacitor initially in a substantially discharged state prior to closing the contactors K1p and K1n and starting up the illustrated system. Preferably, the commutation capacitor is connected between the juncture M of the auxiliary valves and the neutral S of the three star-connected stator windings.

In the manner previously explained under the heading "Background of the Invention," the main valves T1–T6 in turn are forced to turn off by the commutation action that is initiated each time one or the other of the auxiliary valves Tp and Tn is turned on. The controller 44 is arranged cyclically to produce a series of periodic firing signals for alternately turning on the two auxiliary valves in synchronism with the variable frequency fundamental component of the sinusoidal phase-to-phase alternating voltages that are developed at the line terminals of the respective phases A, B, and C of the stator windings as the field winding 18 rotates inside the stator of the machine 14. Note that the peak magnitude of reverse voltage imposed on the auxiliary valves can be reduced, if desired, by respectively inserting simple diodes in series therewith.

To produce the valve firing signals at proper times, the controller 44 needs to receive from the power system information or data indicating when the fundamental waveforms of line-to-neutral magnetic flux in the three phases A, B and C of the machine 14 cross zero and change polarity, and indicating the status of the electrostatic charge or voltage on the commutation capacitor 45. Such data are supplied by means of a voltage processor 38 which, as can be seen in FIG. 1, has a plurality of input wires respectively connected to the line terminals of the stator windings and to opposite sides of the capacitor 45. Inside the processor 48 there is bistable first means for sensing the electrical potential difference across the commutation capacitor. Whenever the potential at the juncture M is measurably positive with respect to the neutral S, the first means is in one state and provides a discrete signal (VE1) that is high or "1," but when this potential is measurably negative with respect to neutral the first means is in a different state in which the output signal VE1 is low or "0." Voltage sensors suitable for this purpose are well known and readily available to a person skilled in the art. The signal VE1 is supplied over an output bus 50 to the controller 44. An additional bistable voltage sensing means is provided in the voltage processor 48 for detecting whether or not the capacitor voltage has a magnitude exceeding a predetermined level, either positive or negative. In one practical application of the illustrated system, the predetermined level is 400 volts. The additional sensor produces a discrete signal (VE2) on the output bus 50. As the commutation capacitor charges or recharges to a voltage magnitude in excess of the predetermined level, the signal VE2 changes from a "0" to a "1" state.

The voltage processor 48 also includes suitable means for integrating the respective line-to-neutral voltages of the stator windings and for indicating whether the polarity of the integral is positive or negative. The latter means provides three discrete output signals XA, XB and XC which are respectively supplied over lines 51, 52 and 53 to the controller 44. The output signal XA is high or "1" only during the half cycles that the time integral of the voltage between the line terminal of phase A and the neutral S is relatively positive. It will be apparent that up and down changes of XA coincide with successive zero crossings of both the magnitude of line-to-neutral flux in phase A and the magnitude of the fundamental phase-to-phase alternating voltage developed at the stator line terminals of phases C and B (i.e., the line terminals to which the a-c terminals 13 and 12 of the inverter are respectively connected). Similarly, the output signal XB is "1" only during the half cycles that the integral of the phase B-to-neutral voltage is relatively positive, whereby up and down changes of XB coincide with successive zero crossings of both the magnitude of line-to-neutral flux in phase B and the magnitude of the fundamental phase-A-to-phase-C alternating voltage developed at the stator line terminals to which the a-c terminals 11 and 13 are connected. In a similar manner, the output signal XC is "1" only during the positive half cycles of the integral of the phase C-to-neutral voltage, whereby the up and down changes of XC coincide with successive zero crossings of both the magnitude of line-to-neutral flux in phase C and the magnitude of the fundamental phase-B-to-phase-A alternating voltage developed at the stator line terminals to which a-c terminals 12 and 11 are respectively connected. By logically processing the resulting output signals XA, XB, and XC, the six different combinations of relative polarities of the three phase-to-phase voltages are indicated during each cycle of operation. Each time the magnitude of any of these voltages crosses zero, a different one of the output signals changes either from 0 to 1 or from 1 to 0.

The controller 44 also communicates with master controls 54 via input and output busses 55 and 56. A starting switch 57 is associated with the master controls 54. The starting switch 57 can be either a pushbutton type or a turn-and-hold type.

The presently preferred embodiment of the controller 44 is shown in more detail in FIG. 1A. Its main component is a microcomputer 60. Persons skilled in the art will understand that the microcomputer 60 is actually a coordinated system of commercially available components and associated electrical circuits and elements that can be programmed to perform a variety of desired functions. It typically comprises a central processing unit (CPU) which executes an operating program permanently stored in a read-only memory (ROM) which also stores tables and data utilized in the program. Contained within the CPU are conventional counters, registers, accumulators, flag flip flops, etc. along with a precision oscillator which provides a high-frequency clock signal. The microcomputer also includes a random access memory (RAM) into which data may be temporarily stored and from which data may be read at various address locations determined by the program stored in the ROM. The CPU, ROM, and RAM are interconnected by appropriate address, data, and control busses. In one practical embodiment of the invention, an Intel 8031 microprocessor is used.

The other blocks shown in FIG. 1A represent conventional peripheral and interface components that interconnect the microcomputer 60 and the external circuits of FIG. 1. More particularly, block 61 is an input/output circuit (I/O) for connecting the output bus and lines 50–53 of the voltage processor 48 to the microcomputer 60, and block 62 is another I/O for connecting the microcomputer 60 to the contactor drivers 38. Block 63 is suitable means for decoding the position indicators that are respectively associated with the contactors K1$p$, K1$n$, K2, and K3. Block 64 is a gate pulse generator (GPG) and buffer that produces, on command of the microcomputer 60, properly shaped and isolated firing signals that turn on the respective valves T1–T6, Tp, and Tn.

Figure 3:
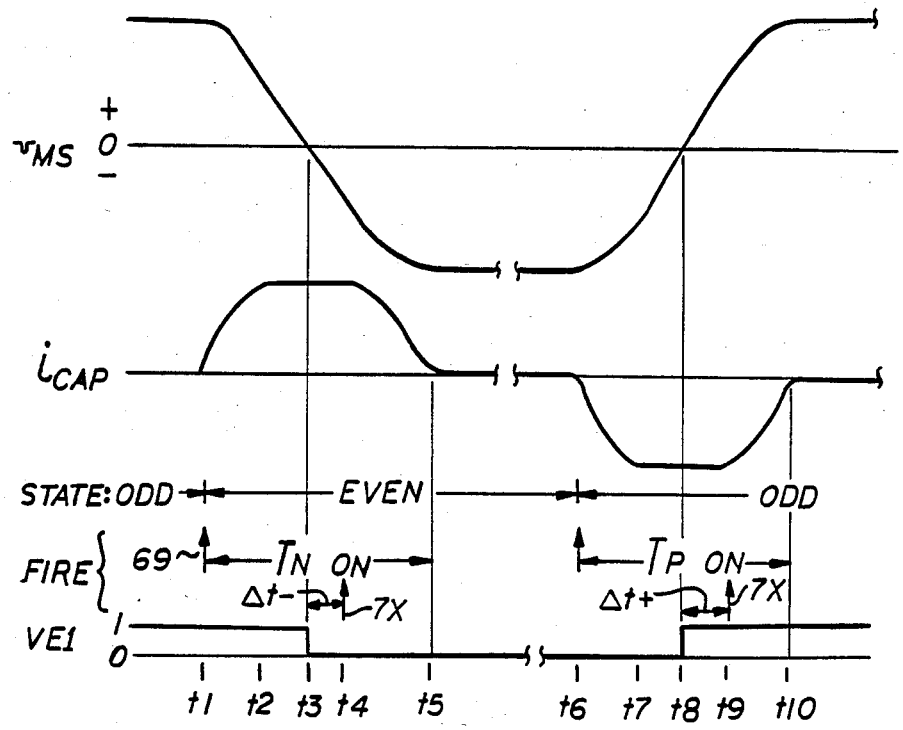
FIG. 3 is a larger scale time chart showing variations in voltage and current of the commutation capacitor during transitions from odd to even states and from even to odd states.
Figure 2:
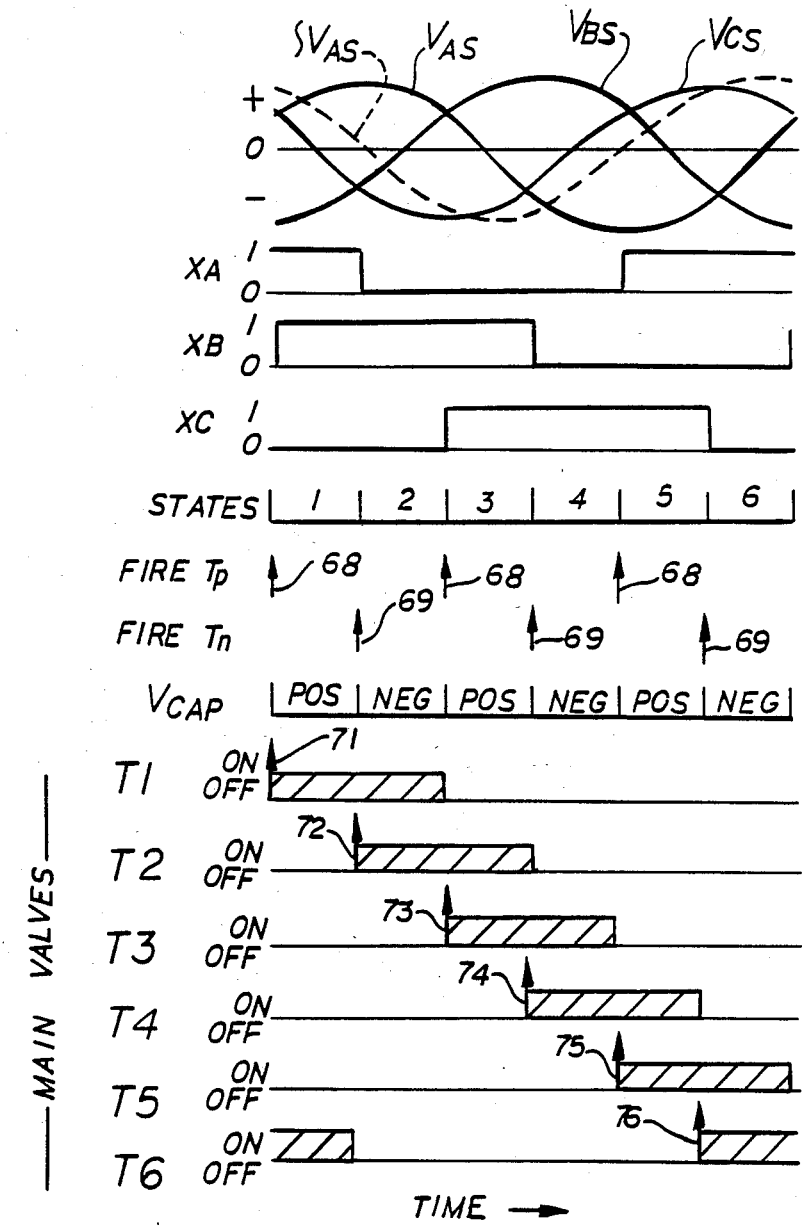
FIG. 2 is a time chart showing, for one full cycle of operation in a third harmonic commutation mode, the six possible states of 3-phase fundamental stator voltages and the family of twelve firing signals produced by the controller.

The operation of the controller 44 during engine cranking can best be understood with the aid of FIGS. 2 and 3. In FIG. 2, the sinusoidal waveforms of the fundamental components of the three line-to-neutral voltage $V_{AS}$, $V_{BS}$, and $V_{CS}$ of the 3-phase stator windings of the machine 14 are depicted by solid-line traces for a full cycle of steady-state operation, and the integral of one such waveform (i.e., phase A) is shown by the broken-line trace. This integral is known to be in phase with the flux of phase A. Assuming a symmetrical 3-phase machine and balanced loading, the zero crossings of the integral of $V_{AS}$ are seen to coincide with the moments of equality between $V_{BS}$ and $V_{CS}$, that is, with the zero crossings of the instantaneous magnitude of the fundamental phase-to-phase alternating voltage between the line terminals of phases B and C. Consequently the discrete signal XA on output line 51 of the zero crossing detecting means in the voltage processor 48 is "1" throughout each half cycle of relatively positive polarity of the phase C-to-phase B voltage and is "0" throughout each relatively negative half cycle thereof, the signal XB on the output line 52 is "1" throughout each relatively positive half cycle of the phase A-to-phase C voltage but is otherwise "0," and the output signal XC is "1" only during each relatively positive half cycle of the phase B-to-phase A voltage. The six different states of these three signals are marked off and numbered consecutively in FIG. 2. For example, state 1 exists so long as both XA and XB but not XC are "1," whereas state 2 exists while XB alone is "1." A state change is experienced each time any one of the signals XA, XB, or XC changes up or down, and each state coincides with a different 60-degree segment of a full cycle (360 electrical degrees) of the fundamental component of alternating voltage.

In a manner that will soon be described, in its third harmonic commutation mode of operation the controller 44 automatically responds to consecutive state changes of the signals XA, XB, and XC by producing a series of firing signals (which are represented by the pointers 68 and 69 in FIG. 2) for alternately turning on the two auxiliary valves Tp and Tn. More particularly, the controller is effective to produce a firing signal 69 for turning on the auxiliary valve Tn in immediate response to each change from an odd numbered state to the succeeding even numbered state (i.e., from state 1 to state 2, from state 3 to state 4, and from state 5 to state 6), and it is effective to produce a firing signal 68 for turning on the auxiliary valve Tp in immediate response to each change from an even numbered state to the succeeding odd numbered state (i.e., from state 6 to state 1, from state 2 to state 3, and from state 4 to state 5). By thus synchronizing the firing signals 68 and 69 with the state changes (which are determined by the angular location of the rotor 15 in the machine 14), the angle between the field mmf and the stator mmf of the machine is controlled.

As was previously explained, turning on an auxiliary valve causes load current immediately to transfer from an offgoing main valve to a parallel path including the turned-on auxiliary valve and the precharged commutation capacitor 45 which is first discharged and then recharged with reverse polarity by such current. As is indicated in FIG. 2, the polarity of the capacitor voltage will change from positive (i.e., the potential at the juncture M is positive with respect to the neutral S) to negative as a result of the auxiliary valve Tn being turned on by one of the firing signals 69, and it will change from negative to positive when the auxiliary valve Tp is turned on by one of the firing signals 68.

Following the production of each of the firing signals 68 and 69, the controller 44 selectively produces the next one of a series of six firing signals (represented in FIG. 2 by the pointers 71-76) which are applied to the gates of the main valves T1-T6, respectively. The controller selects the proper firing signal to turn on whichever one of the main valves is associated with the oncoming or relieving phase of the stator voltages, whereupon load current can then transfer to the oncoming valve from the turned-on auxiliary valve. More particularly, as indicated in FIG. 2, the controller selects the firing signal 71 for turning on the main valve T1 if the preceding state change was from state 6 to state 1, it selects the firing signal 72 for turning on the main valve T2 if the preceding state change was from state 1 to state 2, it selects the firing signal 73 for turning on the main valve T3 if the preceding state change was from 2 to 3, it selects the firing signal 74 for turning on the main valve T4 if the preceding state change was from 3 to 4, it selects the firing signal 75 for turning on the main valve T5 if the preceding state change was from 4 to 5, and it selects the firing signal 76 for turning on the main valve T6 if the preceding state change was from 5 to 6. Whichever one of the firing signals 71-76 is selected, it is not actually produced until after the first-mentioned bistable capacitor voltage sensing means in the voltage processor 48 changes state, as indicated by an up or down change of the discrete signal VE1 on the output bus 50 of the processor 48. This is best seen in FIG. 3 which will now be described.

FIG. 3 shows the instantaneous magnitudes of capacitor voltage ($v_{MS}$) and current ($i_{CAP}$) during two consecutive commutation intervals. The first of these two intervals is initiated at time t1 when the means for detecting the zero crossings of phase-to-phase voltages changes from an odd state to an even state and the controller responds by producing a firing signal 69 to turn on the auxiliary valve Tn, and the second commutation interval is initiated at time t6 when a firing signal 68 for the auxiliary valve Tp is next produced in response to the same detector changing from even to odd states. Once the first commutation interval is initiated, current begins to increase in the auxiliary valve Tn and in the commutation capacitor 45, while current in the offgoing main valve decreases to zero at time t2 which occurs when all of the load current has transferred to the parallel commutation circuit. The resulting pulse of current in the commutation capacitor first discharges it and then recharges it with reverse polarity. At time t3 the capacitor is fully discharged, whereupon the discrete signal VE1 changes from its initial "1" state to a different state. The time from t2 to t3 is the circuit turn off time during which the offgoing main valve recovers its ability to withstand reapplied forward voltage. The next one (7X) of the series of firing signals 71-76 for the main valves T1-T6 is produced in response to the 1-to-0 change of VE1.

The preferred embodiment of the controller 44 includes time delay means effective at least after a predetermined initial period of time for delaying the production of the next firing signal 7X until a programmed interval of time has elapsed following the 1-to-0 change of VE1. This interval is designated by the delta t- symbol in FIG. 3, and it elapses at time t4. Now the oncoming main valve TX is turned on, and load current begins transferring to it from the parallel commutation circuit while continuing to recharge the capacitor 45. At time t5 all of the load current has transferred to the oncoming main valve, the auxiliary valve Tn turns off, and the first commutation interval is finished. The peak magnitude of capacitor voltage (i.e., its magnitude at time t5) is a function of the magnitude of load current that recharges the capacitor during the delta t- delay interval. As load current decreases, the peak magnitude of capacitor voltage will decrease, and consequently the length of the commutation interval is desirably reduced. From t5 to t6 the commutation capacitor will retain a voltage of sufficient magnitude and proper polarity (negative) to ensure successful commutation when the next zero crossing of phase-to-phase voltages initiates the second commutation interval.

As is apparent in FIG. 3, the second commutation interval is essentially a dual of the first. In this case the programmed delay interval (i.e., the time from the 0-to-1 change of the discrete signal VE1 to the production of the firing signal 7X for turning on the next oncoming main valve) is designated delta t+, and its duration can either be the same as or differ from the duration of delta t−. In practice, the programmer will select delay intervals that are compatible with the parameters of the power system and the ratings of its components. In the preferred embodiment, after a predetermined initial period of time from the start of engine cranking, alternate delay intervals (delta t−) are programmed to have a shorter duration than intermediate delay intervals (delta t+).

Figure 4:
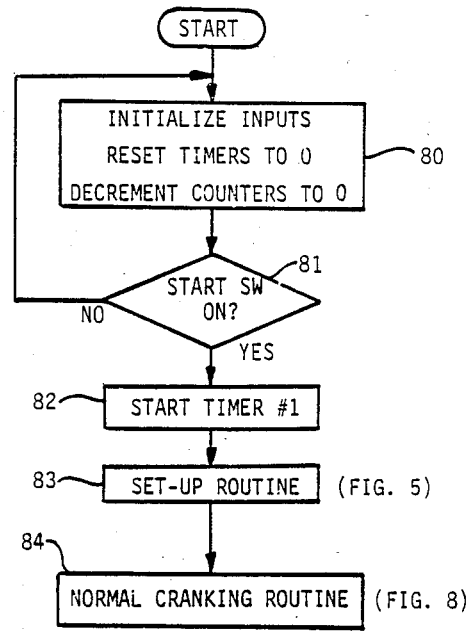
FIGS. 4–11 are flow charts that explain the operation of the preferred embodiment of the FIG. 1A controller to produce the firing signals shown in FIGS. 2 and 3 and also to produce the firing signals that implement the capacitor precharging means of the present invention.

FIGS. 4 through 11 display flow charts of the presently preferred programs that are executed by the microcomputer 60 in the controller 44 in order to produce firing signals that enable the inverter to operate in a third harmonic commutation mode for purposes of cranking the engine 16. The Main Routine is shown in FIG. 4. It begins at the entry point labeled "Start." When commanded to start, the first step 80 of the Main Routine is to initialize the various inputs to the microcomputer 60, to reset its timers to 0, to decrement its counters to 0, and to set the stack pointers, registers, latches, outputs, and variable values of the microcomputer to their respective quiescent states or normal levels at the start of the first pass through the Main Routine. Upon completing this initializing step, the program determines, at a decision point 81, whether or not the start switch 57 is "on." Assuming the start switch is turned on or closed (which will happen at a time when the rotor of the synchronous machine 14 is at rest and the commutation capacitor 45 is discharged), the control proceeds to a step 82 in which a first timer is started. By way of example, this timer will run for approximately 90 seconds after being started. Once timer #1 has been started, a Set-Up Routine 83 is executed, and this is followed by the execution of a Normal Cranking Routine 84.

Figure 5:
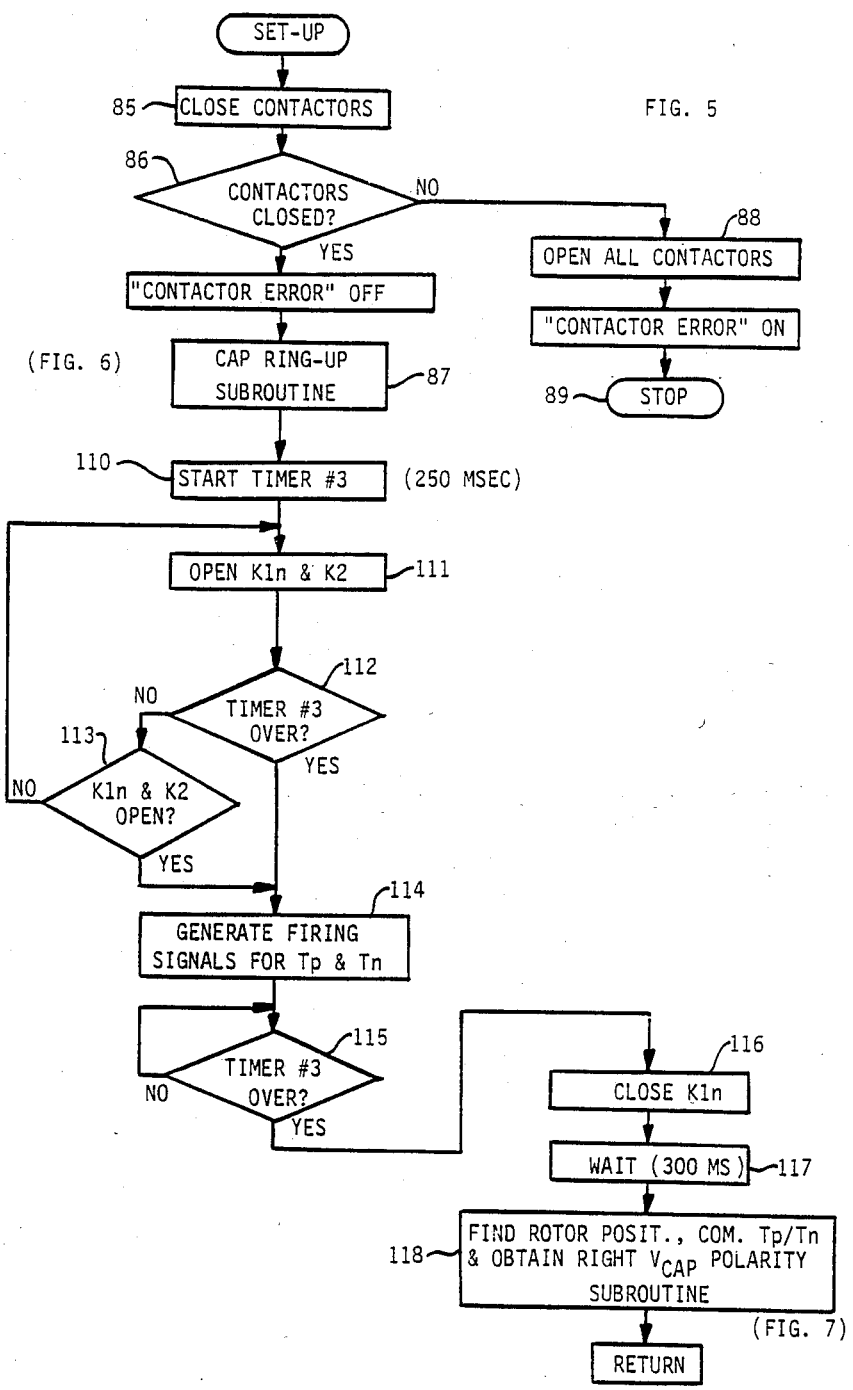

The Set-up Routine 83 is shown in FIG. 5. Its purpose is to control the contactors and valves of the power system (FIG. 1) so as to: (1) precharge the commutation capacitor 45, (2) initiate a pulse of-excitation current from the battery 17 through the field winding of the machine 14 and find the initial angular position of the rotor 15, and (3) ensure that the capacitor voltage has the right polarity for successful third harmonic commutation once the Normal Cranking Routine is initiated. The Set-up Routine is entered at a point labeled "Set-up" and then proceeds to a step 85 which causes the controller 44 to issue signals, via lines 40–43, that command the contactor actuating mechanisms (38) to close the four contactors K1p, K1n, K2, and K3. This step is followed by an inquiry, at point 86, as to the open or closed status of the contactors. Once all four are actually closed, a "Contactor Error" flag is set in an "off" state, and the control is transferred to a Capacitor Ring-up Subroutine 87 which will soon be described. If all four contactors do not close in response to the closing commands of step 85, they are commanded to open (step 88), the Contactor Error flag is set in its "on" state, and the Set-up Routine is aborted at the stop point 89.

Figure 6:
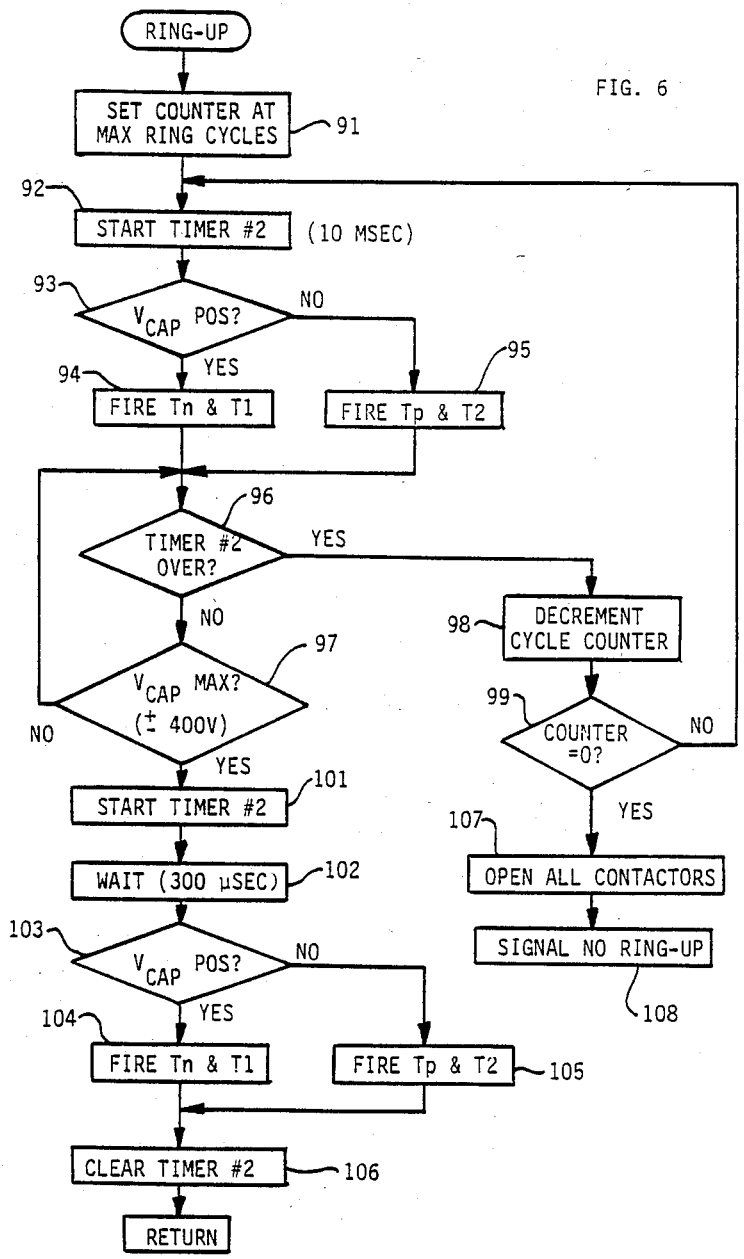

The Capacitor Ring-up Subroutine 87, which is shown in FIG. 6, embodies the present invention. While this subroutine is being executed, the controller 44 will produce firing signals that cause the FIG. 1 system to operate in a capacitor "ring-up" mode that precharges the commutation capacitor. It is entered at a point labeled "Ring-up" and then proceeds to a step 91 which sets a counter in the microcomputer 60 at a predetermined maximum number of ring cycles (e.g., 20 cycles). Step 91 is followed by a step 92 in which a second timer is started. By way of example, this timer will run for an interval of approximately 10 milliseconds after being started. From step 92 the program proceeds to an inquiry point 93 where the state of the first bistable capacitor voltage sensor in the voltage processor 48 is tested. If the commutation capacitor has a measurably positive voltage (i.e., the juncture M has a positive potential with respect to the neutral S and the amount of potential difference exceeds a predetermined threshold such as 5 volts), the first voltage sensor is in one state (which is indicated by VE1 being high) and the inquiry yields an affirmative answer. On the other hand, if the capacitor voltage were measurably negative (i.e., the potential at juncture M is more than 5 volts negative with respect to the neutral S), the voltage sensor is in a different state (as indicated by VE1 being low) and the answer to the inquiry is "no".

In response to an affirmative answer at the inquiry point 93, the next step 94 in the program is to instruct the controller's gate pulse generator 64 to generate a first pair of concurrent firing signals for the auxiliary valve Tn and for a preselected complementary one of the main valves (e.g., T1). In response to a negative answer at 93, the Capacitor Ring-up Subroutine alternatively proceeds to a step 95 in which the gate pulse generator is instructed to generate a second pair of concurrent firing signals for the auxiliary valve Tp and for another preselected complementary one of the main valves (e.g., T2). In practice, each firing signal that is generated in step 94 or 95 can actually comprise a burst of several high-frequency, short-duration discrete d-c signals having sufficient magnitude to turn on the associated valve.

Upon turning on either the complementary pair of valves Tn and T1 or the complementary pair Tp and T2, battery current will begin flowing through a path which in FIG. 1 is seen to comprise: (1) the field winding 18 in parallel with both the resistor 36 and the series combination of resistor 28, inductor 30 and the closed contactor K2, (2) one phase of the armature windings of the machine 14, and (3) the commutation capacitor 45. This path has a sufficiently high Q so that the current quickly oscillates from zero to a peak magnitude and back to zero, and in the process the capacitor is incrementally charged with reverse polarity. The conducting pair of valves will automatically turn off by self commutation when current oscillates to zero at the conclusion of each cycle of this ringing action. The resulting pulse of current typically has a duration of less than two milliseconds.

At the time of the initial pass through the above-described step 92 and inquiry point 93, the commutation capacitor 45 is assumed to be in a substantially discharged state. Consequently Tp and T2 will be the pair of valves that are actually turned on first (by step 95), and the initial pulse of battery current will charge the capacitor with positive polarity. This assumption is usually right, as usually there is sufficient time, before the Capacitor Ring-up Subroutine is entered, for any residual capacitor charge to be dissipated in the bleeder resistor 46 that shunts the capacitor. In the presently preferred embodiment of the invention it does not really matter whether or not there is some residual charge on the capacitor, because in any event the inquiry point 93 steers the control to the proper step 94 or 95. Alternatively, if desired, the Ring-up Subroutine could begin with additional steps (not shown) to "ring-down" any voltage remaining on the capacitor, thereby ensuring that the capacitor voltage initially is essentially 0. In this case there would be no need for inquiry 93, and the control could automatically alternate between steps 94 and 95.

In the Capacitor Ring-up Subroutine, the status of the second timer is tested immediately after either step 94 or step 95. This testing step is indicated in FIG. 6 by the inquiry point 96. Assuming that timer #2 is still running, the next step 97 in the program is to check the state of the second bistable capacitor voltage sensor in the voltage processor 48. So long as the magnitude of capacitor voltage does not exceed a predetermined maximum (i.e., the level at which the output signal VE2 of the second voltage sensor changes from "0" to "1"), step 97 yields a negative answer, and the control returns to the preceding step 96. Whenever timer #2 stops running (i.e., its time delay interval is over), the control proceeds from step 96 to a step 98 in which the count stored in the cycle counter (see step 91) is reduced by one, and then to a step 99 that determines whether or not the count has reached 0. If not, the control returns to step 92, and the steps 92 through 99 are recycled. In this manner the controller repeatedly produces the aforesaid second pair of firing signals (for turning on Tp and T2) if it is determined in step 93 that the capacitor voltage is not positive, and the aforesaid first pair of firing signals (for turning on Tn and T1) if the voltage is positive. The start of each such repeated cycle of operation is delayed by an interval of time determined by timer #2. This interval is sufficiently long to enable the pulse of battery current to first discharge the commutation capacitor and then incrementally recharge it with reverse polarity until the current oscillates to zero. At the end of each consecutive cycle, the electrostatic charge that is stored in the capacitor (and hence the capacitor voltage) will be progressively increased in magnitude due to the ringing nature of the charging current path (the inductance of which is provided by the field and armature windings of the machine 14), and it will have alternately positive and negative polarity. In the illustrated embodiment of the invention, this action continues for a sufficient number of cycles to enable the magnitude of capacitor voltage to attain the aforesaid maximum at which the inquiry step 97 yields an affirmative answer, whereupon the second timer is stopped (step 101) and, after waiting a very short, fixed period of time (step 102), the control proceeds to execute one final ring-up cycle of operation.

As is shown in FIG. 6, the final cycle of the Capacitor Ring-up Subroutine is carried out by steps 103, 104, and 105 which are duplicates of the previously described steps 93, 94, and 95, respectively. Following the generation of the last pair of concurrent firing signals (either for the complementary valves Tn and T1 or for the complementary valves Tp and T2), timer #2 is cleared (step 106), and then the control returns to the Set-up Routine (FIG. 5). In accordance with the present invention, the total number of ring-up cycles that are carried out by the Capacitor Ring-up Subroutine is sufficient for the commutation capacitor to charge to a voltage magnitude many times (i.e., more than approximately five times) higher than the average magnitude of voltage at the terminals of the battery 17. Preferably the Q of the capacitor charging/discharging path is high enough to achieve this result in less than five or six cycles. In the FIG. 6 embodiment the actual number of ring-up cycles is indefinite, being one more than whatever number is required for inquiry point 97 to yield a positive answer. Alternatively, if it were known that the capacitor initially is discharged, the subroutine could be exited after a predetermined definite number of cycles. In one practical embodiment, the capacitance of the commutation capacitor is 1,700 microfarads, Q is approximately 6 when the battery 17 has its minimum permissible charge (i.e., when its internal resistance is 37 milliohms), and in four or five cycles the capacitor can be charged to a voltage magnitude exceeding 400 volts.

If for any reason the capacitor were not charged to the desired level within the maximum number of ring cycles that was set at step 91, the count in the cycle counter would reach 0 (step 99) before the second capacitor voltage sensor detects maximum voltage (step 97), and in this abnormal event all of the contactors are commanded to open (step 107) and a "No Ring-up" signal is issued (step 108).

After execution of the Capacitor Ring-up Subroutine 87, and with the commutation capacitor now precharged, the Set-up Routine 83 continues as shown in FIG. 5. The next step 110 is to start a third timer. By way of example, this timer will run for an interval of approximately 250 milliseconds after being started. From step 110 the control proceeds to a step 111 which causes the controller 44 to command the contactor actuating mechanisms to open both of the contactors K1n and K2. This is followed by testing, at point 112, the status of the third timer and by testing, at point 113, the open or closed status of the contactors K1n and K2. As soon as both of these contactors actually open, but no later than the time at which timer #3 stops running, the control proceeds to a step 114 in which the gate pulse generator is instructed to generate concurrent firing signals for turning on a preselected pair of valves that will provide a path for excitation current from the battery 17 through the field winding 18 of the synchronous machine 14. Any appropriate pair of valves can be turned on for this purpose. The auxiliary valves Tp and Tn were selected in the illustrated embodiment. Once these valves are turned on, field current starts increasing or ramping up from zero.

After generating the firing signals for the auxiliary valves Tp and Tn (step 114), the Set-up Routine proceeds to an inquiry point 115 where the status of timer #3 is tested again. If the time delay interval of this timer is over, the control proceeds from step 115 to a step 116 in which the contactor K1n is commanded to reclose. When K1n recloses, the series resistors 28 and 29 are reconnected in parallel with the field winding 18 (FIG. 1), thereby permitting a more rapid increase of current in the auxiliary valves. Step 116 is followed by a step 117 which introduces an additional delay (e.g., a fixed period of approximately 300 milliseconds) to allow excitation current in the field winding 18 to continue increasing. Upon the expiration of this additional delay (at which time current in Tp and Tn may have attained a magnitude as high as 1,300 amperes), the control is transferred to a subroutine 118 which will soon be explained. Executing the subroutine 118 completes the Set-up Routine (FIG. 5), and the control will then return to the Main Routine (FIG. 4).

Figure 7:
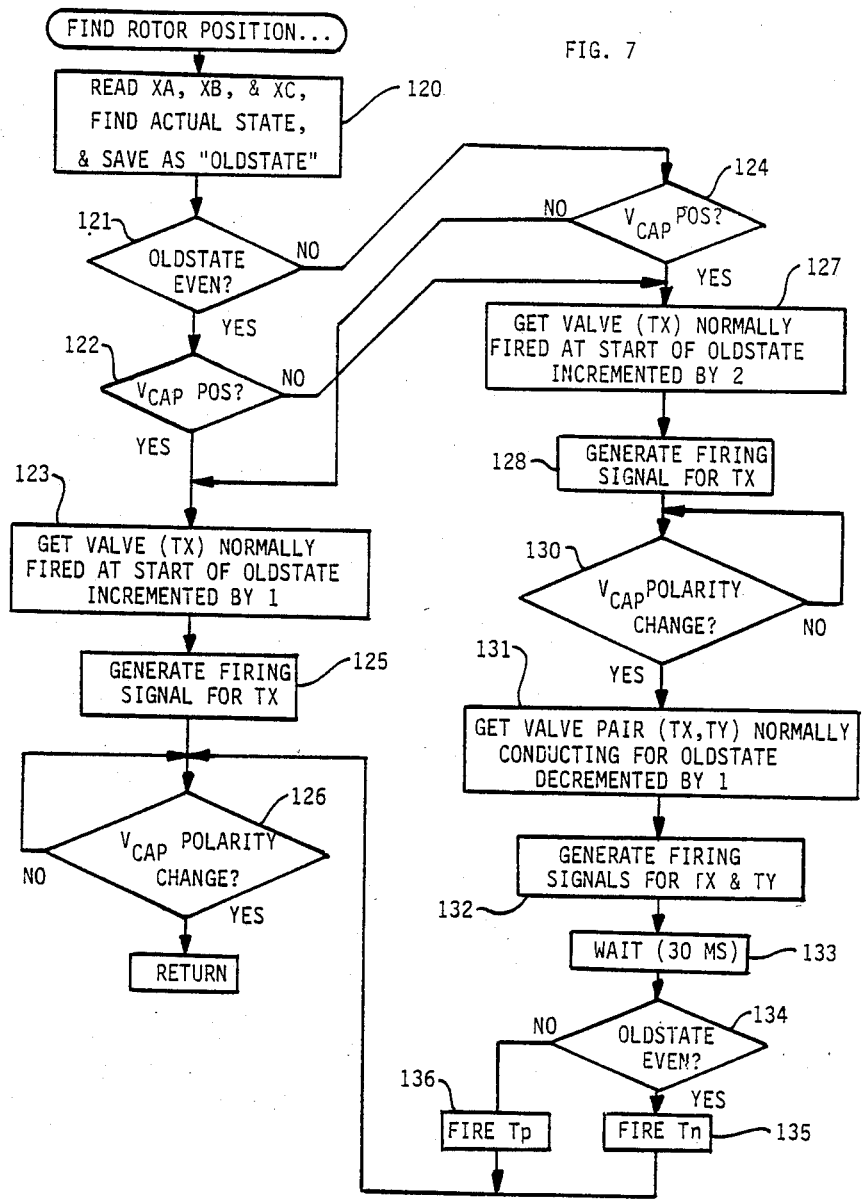

The presently preferred embodiment of the subroutine 118 is shown in FIG. 7. While this subroutine is being executed, the controller 44 finds the initial or at-rest position of the rotor 15, and it produces firing signals that will turn on the proper main valve(s) for commutating (turning off) the auxiliary valves Tp and Tn and for obtaining the right polarity of voltage on the commutation capacitor. Note that at the time this subroutine is entered, excitation current is rising in the field winding 18 on the rotor 15 of the machine 14. Consequently the field winding (rotor) generates magnetic flux of increasing magnitude, and this changing flux in turn interacts with the three phases A, B, and C of the armature windings (stator) to induce therein line-to-neutral voltages that can be sensed and integrated by the voltage processor 48. The initial angular position of the rotor can be deduced from knowledge of the relative polarities of the time integrals of these three voltages.

As is indicated in FIG. 7, the subroutine 118 is entered at a point labeled "Find Rotor Position . . ." and then proceeds to a step 120 in which the microcomputer 60: (1) reads data representing the high or low conditions of the three phase-to-phase stator voltage zero-crossing detecting signals XA, XB, and XC on the output lines 51, 52, and 53 of the voltage processor 48, (2) uses a logical combination of this data to find, in an appropriately encoded look-up table, whichever one of the six different states 1 through 6 (see FIG. 2) is extant, and (3) places the number of the extant or actual state in a selected register of its memory where this number is saved as "oldstate." From step 120 the subroutine proceeds to a decision point 121 which determines whether or not the oldstate is even (i.e., 2, 4, or 6). If the oldstate is even, the next step 122 in the program inquires as to the polarity of the voltage on the precharged commutation capacitor (as indicated by the high or low state of the discrete output signal VE1 from the first voltage sensor in the voltage processor 48), and if the polarity is positive the control proceeds to a step 123. On the other hand, if it is determined that the oldstate is not even (i.e., is 1, 3, or 5), the subroutine alternatively proceeds from step 121 to another inquiry point 124 which is a duplicate of the inquiry 122, and if the polarity is not positive the control proceeds to the same step 123.

In step 123 the microcomputer reads the oldstate, increments it by 1 to find the number of the succeeding state, and identifies the proper one (TX) of the six main valves that is scheduled to be turned on in response to the next state change. For example, if oldstate=2, the succeeding state is 3 and TX is T3. Step 123 is immediately followed by a step 125 in which the controller 44 is instructed to generate a firing signal for the identified valve TX. Once TX is turned on by this firing signal, it completes a path for battery current in parallel with a first one of the two auxiliary valves that were turned on by step 114 of the Set-up Routine 83. The parallel path includes one phase of the stator windings and the precharged commutation capacitor, and the capacitor voltage will have the proper polarity to provide commutating action that quickly forces the first auxiliary valve to turn off. The current flowing in this path and through the other auxiliary valve rises to a peak magnitude and then decays to zero (in the process of which the commutation capacitor will be discharged and then recharged with reverse polarity), and both TX and the second auxiliary valve will automatically turn off by self commutation when the current oscillates to zero at the conclusion of this ringing action. Now the capacitor voltage has the correct polarity for successful commutation of the main valves at the next zero crossing of the phase-to-phase stator voltages during the engine cranking mode of operation. FIG. 2 illustrates that the correct polarity is negative during even numbered states and positive during odd numbered states.

After step 125 causes the controller to produce a firing signal for turning on TX, and while the above-described ringing action is taking place, the field winding 18 of the machine 14 continues to be excited by current which now "freewheels" through the contactor K1n and the branch of the load current path joining conductors 26 and 27 (FIG. 1). At the same time, the subroutine shown in FIG. 7 proceeds to inquire, at point 126, as to whether or not the capacitor voltage has changed polarity (as indicated by a state change of VE1). As soon as the answer is affirmative, the control returns to the Main Routine, and the Normal Cranking Routine 84 can begin.

As is shown in FIG. 7, there is an alternative way to get to the last inquiry point 126 of the subroutine 118. It includes two steps 127 and 128 that are similar to steps 123 and 125, respectively, except that step 127 increments the oldstate by 2 and identifies the main valve that is scheduled to be turned on in response to the second state change to come. For example, if oldstate=2, oldstate+2=4, and TX is T4. Step 127 is initiated if the answer to inquiry 122 indicates that the capacitor voltage is not positive, or if the answer to inquiry 124 indicates that the capacitor voltage is positive. It is immediately followed by the step 128 which causes the controller to generate a firing signal for the main valve TX. When turned on, TX connects the commutation capacitor across a first one of the conducting auxiliary valves Tp and Tn, whereupon the first auxiliary valve is forced to turn off, the commutation capacitor is discharged then recharged with reverse polarity, and both TX and the other auxiliary valve will turn off as soon as the battery current oscillates to zero. At this time the polarity of the capacitor voltage will not be correct for successful commutation of the main valves when cranking starts unless prior thereto a series of additional steps 130 through 136 are followed to reverse this polarity from wrong to right.

Step 130, which immediately follows step 128, performs the same inquiry as point 126, and as soon as the capacitor voltage changes polarity the control proceeds to step 131. In step 131 the microcomputer reads the oldstate, decrements it by 1 to find the number of the preceding state, and identifies the proper pair (TX, TY) of the six main valves that are normally conducting load current during such preceding state. For example, if oldstate=2, the preceding state is 1 and the valve pair TX, TY are T6 and T1, respectively. Step 131 is immediately followed by the step 132 in which the controller is instructed to generate concurrent firing signals for the valves TX and TY. When the valves TX and TY are turned on by these firing signals, they enable battery current to resume flowing in the armature windings of the machine 14. After the firing signals are generated (step 132), the control waits for a period of approximately 30 milliseconds to allow excitation current in the field winding 18 (step 133) to increase in magnitude, and it then proceeds to a decision point 134 which determines whether or not the oldstate is an even number. If the oldstate is even, the next step 135 is to generate a firing signal for turning on the auxiliary valve Tn, if the oldstate is not even, an alternative step 136 is implemented to generate a firing signal for turning on the auxiliary valve Tp, and in either case the control proceeds from step 135 or 136 to the previously described inquiry point 126. Once valve Tn (or Tp) is turned on by step 135 (or 136), it connects the precharged commutation capacitor across the main valve TX which is thereby forced commutated off. The current that transfers from TX to the auxiliary valve first discharges and then recharges the commutation capacitor with opposite polarity, and both TY and the auxiliary valve will automatically turn off by self commutation as this current oscillates to zero. Now the capacitor voltage has the right polarity for successful commutation of the main valves when cranking starts. As was previously explained, the control transfers to the Normal Cranking Routine 84 as soon as the inquiry point 126 detects a change in the polarity of the voltage on the commutation capacitor.

Figure 8:
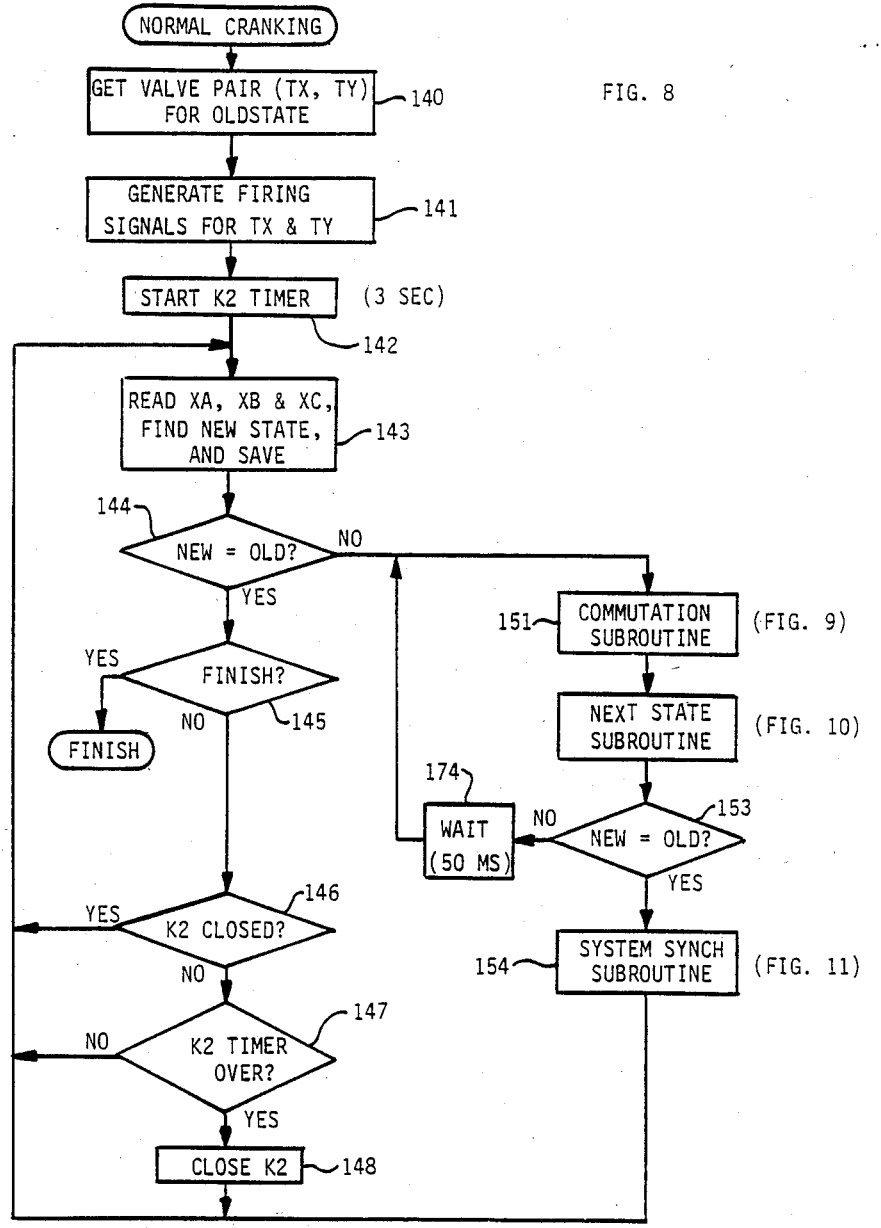

The Normal Cranking Routine 84 will cause the controller 44 to produce the proper pattern of properly synchronized firing signals as required for the inverter to operate in a third harmonic commutation mode, whereby mechanical torque is developed in the rotor of the machine 14 to start turning the crankshaft of the engine 16 and to accelerate it from rest to a predetermined speed (e.g., 240 rpm) well above the minimum "firing speed" of the engine. The presently preferred embodiment of this routine is shown in FIG. 8. In its first step 140, the oldstate that was saved in the memory of the microcomputer 60 is used to find, in an appropriately encoded look-up table, the identity of the pair of main valves (TX, TY) that normally should be conducting load current during such state. For example, if oldstate=2, TX is T1, and TY is T2. Step 140 is followed immediately by a step 141 in which the controller is instructed to generate the proper pair of firing signals (e.g., 71 and 72) to turn on both of the valves TX and TY. In practice, each firing signal can actually comprise a 35-microsecond burst of from five to ten short-duration (1.5 microseconds) discrete d-c signals having sufficient magnitude to turn on the associated valve.

Once the main valves TX and TY are turned on by step 141, they complete a path for load current to flow from the battery 17 through two phases of the armature (stator) windings of the machine 14, and through the section of the path that interconnects conductors 25 and 26 (FIG. 1). The latter section comprises the field winding 18 (which was inserted therein when the two poles K3a and K3b of contactor K3 were closed by step 85 of the Set-up Routine 83) and the parallel branch that includes conductor 27, resistor 28, resistor 29 shunted by contactor K2, and inductor 30. Since K2 opened at step 111 of the Set-up Routine and has not yet reclosed, both resistors 28 and 29 are now effectively in series in this parallel branch. The magnitude of armature current is initially very high, limited only by the internal resistance of the battery, the negligible resistance of the armature windings, and the total resistance of the two resistors 28 and 29. At the time TX and TY start conducting load current, the field winding 18 is being excited by the residual of the current that had previously built up therein during the interval of time between the execution of step 114 (FIG. 5) and the execution of step 125, 135 or 136 (FIG. 7) in the Set-up Routine. The magnetic fields generated by current in the armature windings now interact with the excitation current in the field winding to produce in the rotor 15 a torque (proportional to the product of the magnitudes of these currents) that tends to turn the crankshaft of the engine 16 in the desired direction.

In one practical embodiment, currents in the armature and field windings were high enough, with the battery not fully charged, to produce a "breakaway" torque of at least 3,600 foot-pounds which is sufficient to turn the crankshaft of a 4,000 horsepower diesel engine. As the crankshaft and rotor start rotating, current (and torque) tends to decrease in magnitude due to the rising amplitude of the back emf that is induced in the armature windings and that opposes the battery voltage. The instantaneous magnitude of the back emf in each of the three phases of the synchronous machine will alternate sinusoidally between relatively positive and negative peaks as the rotor accelerates from rest and its angular position advances. In due course the rotor will pass through a location where the increasing voltage magnitude of the oncoming or relieving phase (e.g., B) just equals the decreasing voltage magnitude of the offgoing or relieved phase (e.g., A), whereupon one of the three zero-crossing detecting signals (e.g., XC) will change up or down to mark the transition to the next state.

As is shown in FIG. 8, after generating the firing signals for valves TX and TY (step 141), the Normal Cranking Routine proceeds to a step 142 in which a K2 timer is started. This timer will run for a predetermined length of time (e.g., approximately three seconds) after being started. Step 142 is followed by a step 143 in which the microcomputer: (1) reads data representing the high or low conditions of the signals XA, XB, and XC, (2) uses a logical combination of this data to find, in an appropriately encoded look-up table, whichever one of the six different states 1 through 6 is extant, and (3) places the number of the extant or actual state in its memory where this number is saved as "new state." From step 143 the control proceeds to an inquiry point 144 which determines whether or not the new state is the same as oldstate. So long as the answer is affirmative, the control next inquires, at a point 145, as to whether or not a cranking "finish" flag is on, and if not it then proceeds to an inquiry point 146 where the open or closed status of contactor K2 is tested. If K2 is closed, the control returns to step 143; if not, the status of the K2 timer is tested at point 147. Assuming that the K2 timer is still running, the control immediately returns to step 143. Otherwise, the control proceeds from the inquiry point 147 to a step 148 in which the contactor K2 is commanded to close, whereupon the control returns to step 143. It will now be apparent that so long as the inquiry step 144 determines that the new state is the same as oldstate, the control steps repetitively around a loop comprising the step 143 and inquiry points 144, 145, 146, and 147 while the K2 timer is running, whereas it steps repetitively around a subloop comprising step 143 and inquiry points 144, 145, and 146 after the length of time programmed in the K2 timer is over. In response to the expiration of this predetermined length of time, step 148 is implemented to close the contactor K2 which then short circuits the resistor 29 (FIG. 1), thereby reducing the ohmic value of the resistance in parallel with the field winding 18. As a result, more current can flow in the branch of the load current path between conductors 26 and 27, the field excitation is weakened, and higher cranking speeds can be achieved.

As soon as the inquiry point 144 determines that the new state is not the same as the oldstate (i.e., in response to a state change of one of the phase-to-phase stator voltage zero-crossing detecting signals XA, XB, and XC), the control transfers from the above-described loop to an alternative loop comprising the step 143, inquiry point 144, and, in the following order, a "Commutation Subroutine" 151, a "Next State Subroutine" 152, an inquiry point 153, and a "System Synch Subroutine" 154. The three subroutines 151, 152, and 154 are therefore executed each time the inquiry point 144 detects a state change.

Figure 9:
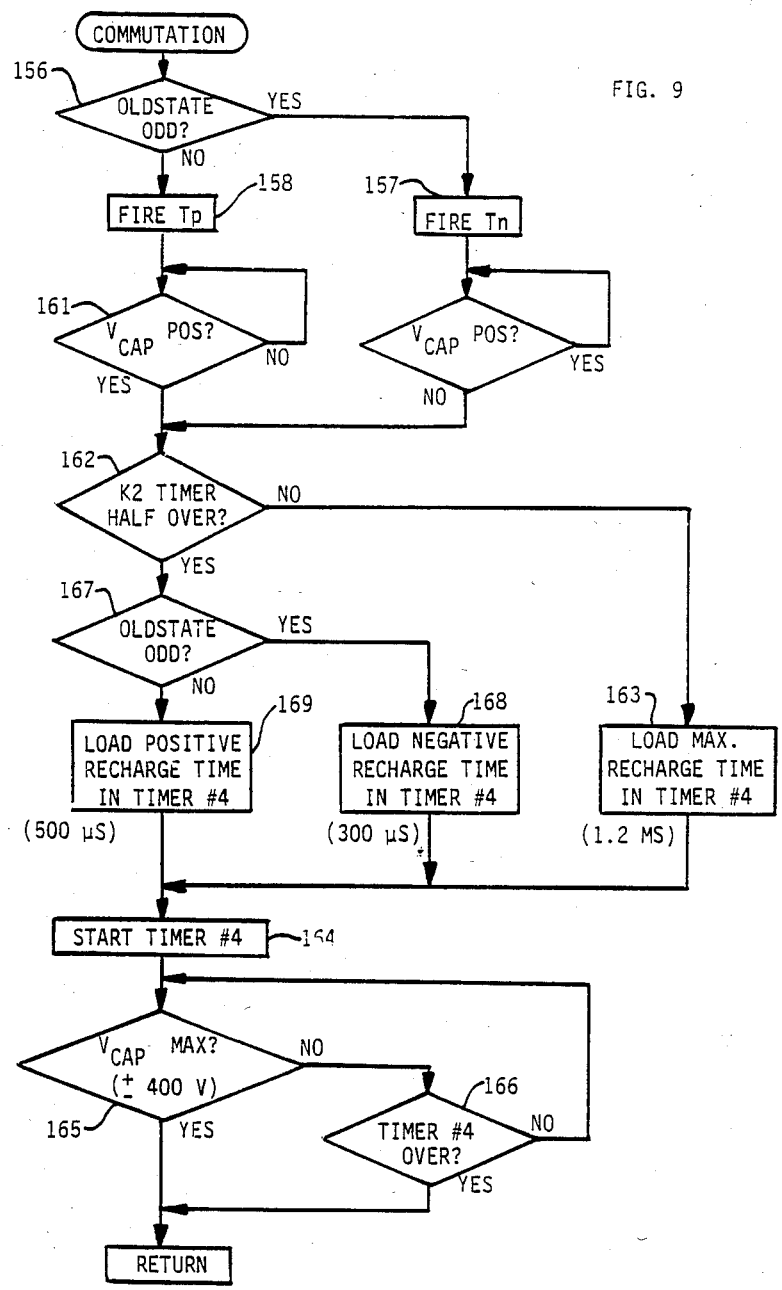

The Commutation Subroutine 151 of the Normal Cranking Routine 84 is shown in FIG. 9. It has two functions: (1) to initiate commutation of the offgoing main valve by order ng the production of a firing signal for the appropriate one of the two auxiliary valves Tp and Tn, and (2) to delay the execution of the Next State Subroutine 152 until a programmed interval of time has elapsed following each resulting zero crossing of the voltage on the commutation capacitor 45. The Commutation Subroutine is entered at a point labeled "Commutation" and then proceeds to a decision point 156 which determines whether or not oldstate was an odd number. If oldstate was odd (i.e., 1, 3 or 5), the control proceeds to a step 157 in which the controller is instructed to produce a firing signal 69 for turning on the auxiliary valve Tn. If oldstate was even (2, 4 or 6), the control proceeds from point 156 to a step 158 in which the controller is instructed to produce a firing signal 68 for turning on the auxiliary valve Tp. Consequently one or the other of the auxiliary valves is turned on to connect the commutation capacitor across the offgoing main valve. The capacitor voltage will now have the correct polarity to force load current to transfer to the conducting auxiliary valve, whereupon the offgoing main valve stops conducting. The load current in the commutation circuit first discharges the capacitor and then recharges it with reverse polarity, as is illustrated in the previously described FIG. 3. More specifically, if oldstate was odd, Tn is fired, and at time t3 the capacitor voltage will change from positive to negative as indicated by a high-to-low state change of the output signal VE1 of the first bistable capacitor voltage sensor in the voltage processor 48. On the other hand, if oldstate was even, Tp is fired, and at time t8 the capacitor voltage will change from negative to positive as indicated by a low-to-high state change of VE1.

As is shown in FIG. 9, step 157 (or 158) of the Commutation Subroutine 151 is immediately followed by an inquiry, at point 160 (or 161), as to the high or low state of the capacitor voltage polarity indicating signal VE1. As soon as VE1 changes the control proceeds from point 160 (or 161) to another inquiry point 162 where the status of the K2 timer is measured. For a predetermined initial period of time, which starts when step 142 of the Normal Cranking Routine 84 starts the K2 timer, the inquiry 162 yields a negative answer, and thereafter the answer will be affirmative. The initial period is preferably approximately 1.5 seconds, or approximately half of the length of time that the K2 timer is programmed to run.

In response to a negative answer at the inquiry point 162, the next step 163 in the program is to load a predetermined maximum capacitor recharging time into a fourth timer. Step 163 is followed immediately by a step 164 that starts the fourth timer and then by an inquiry, at a point 165, as to the state of the second capacitor voltage sensor in the voltage processor 48, as indicated by the high or low state of the signal VE2. So long as the capacitor voltage is lower than the predetermined maximum level (e.g., 400 volts), the answer to inquiry 165 is negative, and the control proceeds to an inquiry point 166 where the status of the fourth timer is tested. So long as the timer #4 is still running, the answer to inquiry 166 is negative, and the control returns to the preceding inquiry point 165. But whenever an affirmative answer is obtained at either inquiry point 165 (revealing that the magnitude of capacitor voltage has attained the aforesaid maximum) or inquiry point 166 (revealing that the time delay interval of the timer #4 is over), whichever is first to occur, the Commutation Subroutine 151 is exited, and the control is transferred to the Next State Subroutine 152 of the Normal Cranking Routine. Preferably the maximum recharge time that is loaded into timer #4 in step 163 is selected to have a relatively long, fixed duration (e.g., approximately 1.2 milliseconds) so that an affirmative answer will ordinarily be obtained from inquiry 165 earlier than from inquiry 166 throughout the aforesaid initial period (i.e., before the inquiry point 162 yields an affirmative answer). In other words, whenever the Commutation Subroutine is executed during the initial period of time, it will be completed as soon as the voltage on the commutation capacitor reverses polarity and rises in magnitude to the aforesaid maximum level (but no later than the expiration of the maximum recharging interval that was loaded in timer #4 at step 163). High capacitor voltage is required for successful commutation during this period when load current is relatively high. At the same time, the relatively long maximum capacitor recharging time is permissible because the rotor speed (and hence the frequency of state changes) is now relatively low.

In response to an affirmative answer at the inquiry. point 162 (which will be true anytime the Commutation Subroutine 151 is executed after expiration of the aforesaid initial period of time), the program shown in FIG. 9 proceeds from point 162 to a decision point 167 which is a duplicate of 156. If oldstate was odd, the next step 168 is to load a "negative" capacitor recharging time into timer #4. Alternatively, if oldstate was even, the next step 169 is to load a "positive" capacitor recharging time into the same timer. In either case, the control then proceeds, as before, to start timer #4 at step 164 and then repetitively to check for maximum capacitor voltage at point 165 and to test the status of the timer at point 166. The delay intervals that are loaded into timer #4 at steps 168 and 169 are shorter than the maximum capacitor recharging interval that is loaded at step 163. While both intervals could be equal to each other if desired, in the illustrated embodiment the negative recharging interval is shorter than the positive recharging interval. By way of example, the negative recharging interval is approximately 300 microseconds, and the positive recharging interval is approximately 500 microseconds. These intervals are sufficiently short so that, after the aforesaid initial period expires (i.e., when the inquiry point 162 yields an affirmative answer), an affirmative answer will ordinarily be obtained from inquiry 166 earlier than from inquiry. 165. In other words, whenever the Commutation Subroutine is executed after the initial period of time, it is completed as soon as the delay interval that was loaded in timer #4 at step 168 or 169 is over, and this does not provide enough time for the commutation capacitor to recharge to the aforesaid maximum level of voltage. Consequently, as was explained hereinbefore in connection with the description of FIG. 3, the actual magnitude of capacitor voltage at the conclusion of the Commutation Subroutine is a function of the magnitude of load current. It decreases with current, and as a result the length of the commutation interval is desirably reduced as the rotor speed (and frequency) increases after the aforesaid initial period of time.

Figure 10:
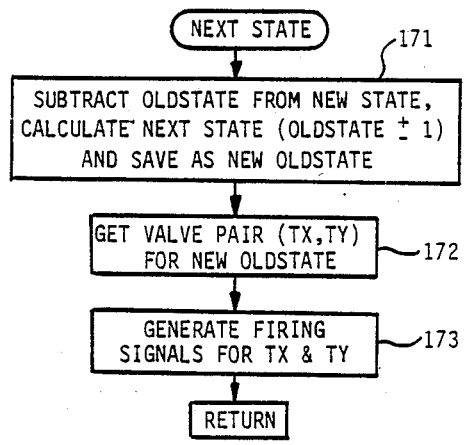

The Next State Subroutine 152, which is executed immediately after the Commutation Subroutine 151, is shown in FIG. 10. Its purposes are (1) to calculate and save the "next state" and (2) to complete the third harmonic commutation process by ordering the production of a firing signal for the oncoming or relieving main valve. This subroutine is entered at a point labeled "Next State" and then proceeds to a step 171 in which the microcomputer (1) subtracts the previously saved oldstate (step 120 in FIG. 7) from the previously saved new state (step 143 in FIG. 8) to find the difference therebetween, the difference being +1 for the assumed phase rotation A-B-C of stator voltages but −1 if the phase rotation were C-B-A, (2) increments the oldstate by one if the difference is +1 (or decrements it if the difference were −1) to give the number of the "next state," i.e., the state which comes after oldstate and which therefore should coincide with the new state, and (3) places the number of the "next state" in the selected register of its memory where this number replaces the previously saved oldstate and is saved as a calculated new oldstate. Step 171 is followed by a step 172 in which the new oldstate is used to find, in an appropriately encoded look-up table, the identity of the pair of main valves (TX, TY) that normally should be conducting load current during such state. For example, if new oldstate=3, TX is T2, and TY is T3. TY is the oncoming or relieving valve of the pair. Step 172 is followed immediately by a step 173 in which the controller is instructed to generate the proper pair of firing signals (e.g., 72 and 73) to turn on the identified valves TX and TY. It will be apparent that the firing signal for valve TX is redundant, as TX in this subroutine is the same valve as TY which was turned on earlier in the program. Once the oncoming valve TY is turned on by a firing signal produced at step 173, load current can transfer to it from the auxiliary valve that was turned on by step 157 or 158 of the Commutation Subroutine 151 (FIG. 9), thereby completing the commutation process. While load current is decaying to zero in the auxiliary valve, the commutation capacitor continues recharging to a peak magnitude somewhat beyond its level of voltage at the conclusion of the Commutation Subroutine.

The firing signal that is produced by step 173 of the Next State Subroutine 152 for the oncoming main valve TY is represented in FIG. 3 by the pointer 7X. It is produced at time t4 if the calculated new oldstate is an even number and at time t9 if odd. Both of these times are delayed with respect to the preceding state change of the capacitor voltage polarity indicating signal VE1 (as detected by the inquiry point 160 or 161 of the Commutation Subroutine 151). Each time the Next State Subroutine is executed during the aforesaid initial period (which is determined by step 162 of the Commutation Subroutine), this delay will depend on how long the commutation capacitor takes to recharge to the voltage level at which an affirmative answer is obtained at the inquiry point 165 in the Commutation Subroutine. But each time the Next State Subroutine is executed after the initial period, the firing signal 7X is delayed until a programmed interval of time has elapsed. If the new oldstate is an even number, the programmed delay interval is determined by the negative recharging time loaded into timer #4 at step 168 of the Commutation Subroutine, and otherwise it is determined by the positive recharging time loaded into the same timer at step 169.

Having generated the firing signal (7X) for the main valve TY at step 173, the Next State Subroutine 152 returns to the Normal Cranking Routine (FIG. 8) where the calculated new oldstate (step 171 in FIG. 10) is checked, at the inquiry point 53, to be sure that it is in fact the same as the previously saved new state (step 143 in FIG. 8). If not, after waiting for a fixed period of approximately 50 milliseconds (step 174), the control is retransferred to the Commutation Subroutine 151, and the two subroutines 151 and 152 are executed again. This process is repeated, if necessary, until the calculated new oldstate coincides with the new state, and then the control is transferred to the System Synch Subroutine 153.

Figure 11:
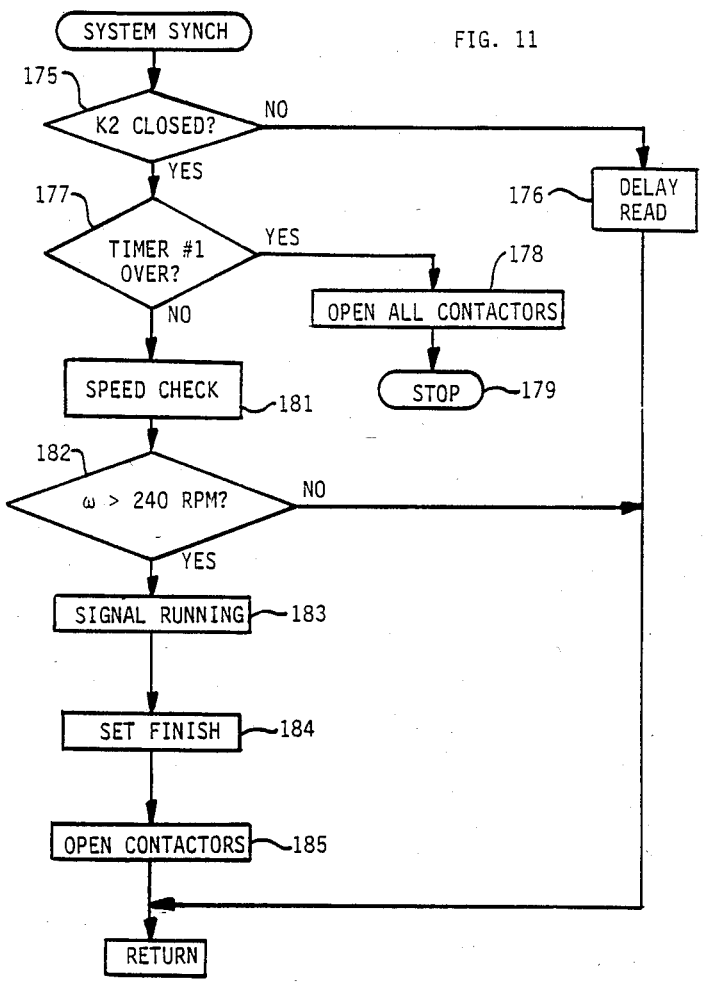

The presently preferred embodiment of the System Synch Subroutine is shown in FIG. 11. It is entered at a point labeled "System Synch" and proceeds to an inquiry point 175 where the open or closed status of the contactor K2 is checked. Initially, while the K2 timer is running (see steps 142 and 147 in FIG. 8) and therefore prior to implementation of the step 148 that commands the contactor K2 to close, this inquiry will reveal that K2 is open. Consequently, after waiting for a certain delay interval (step 176) the control is returned directly to the step 143 of the Normal Cranking Routine 84. The delay introduced by step 176 will allow time, after implementing step 173 of the Next State Subroutine (FIG. 10) and before returning to the step 143, for the above-described commutation from the auxiliary valve (Tp or Tn) to the oncoming main valve TY to be completed and for the resulting electrical transients ("noise") to subside in the voltage processor 48. The delayed return to step 143 is desirable when load current is relatively high (as is true initially), because the aforesaid transients might then be severe enough to cause false data to be supplied on lines 51, 52 and 53 to the controller 44. Once the control returns from step 176 (FIG. 11) to step 143 (FIG. 8), the loop comprising step 143 and inquiry points 144, 145, 146, and 147 is repeatedly executed until the next state change is indicated by a negative answer to inquiry 144 (i.e., until the new state, as determined by step 43, is no longer the same as the new oldstate that was calculated by step 171 of the Next State Subroutine 152), whereupon the control again transfers to the Commutation Subroutine 151.

As the angular position of the rotor of the machine 14 advances with increasing speed during the cranking mode of operation, the above-described execution of the steps 143-147 in the Normal Cranking Routine 84 and of the subroutines 151-154 are automatically repeated until the K2 timer stops running. The Commutation Subroutine 151 is initiated each time the inquiry 144 indicates a state change, and such changes occur with increasing frequency as the rotor accelerates. In practice it make take approximately two seconds for the rotor to complete its first revolution and another second for a second revolution. By the end of two revolutions the rotor may have attained a speed on the order of 100 rpm, and it is around this time that the K2 timer stops runnlng and the contactor K2 is closed to further weaken the field and permit higher speed cranking.

Each time the System Synch Subroutine 154 is executed after contactor K2 is closed, the control will proceed from inquiry point 175 to an inquiry point 177 in which the status of the first timer is tested. As shown in FIG. 11, if timer #1 has stopped running the next step 178 of this subroutine will cause the controller 44 to command all contactors to open, and the Normal Cranking Routine is then aborted at a stop point 179. Assuming, however, that timer #1 is still running, the control proceeds from point 177 to a speed check step 181 where the rotor speed is measured. Any suitable means can be used for this purpose. One simple yet effective means for measuring rotor speed is to count the number of times the Commutation Subroutine 151 is executed over a known period of time. It can be shown that this count is proportional to speed. There are six state changes and hence six commutation intervals per cycle of the fundamental component of alternating voltages on the stator windings of the machine 14, and one complete revolution of the rotor corresponds to five such cycles in a 10-pole machine. Thus the predetermined threshold speed of 240 rpm corresponds to a fundamental frequency of 20 Hertz which is indicated if 12 commutations are counted in a period of 0.1 second.

From step 181 the System Synch Subroutine proceeds to a point 182 that inquires as to whether or not the rotor speed has attained a predetermined rate (i.e., the aforesaid threshold speed of 240 rpm). If not, the control is then returned directly to the step 143 of the Normal Cranking Routine 84 (FIG. 8). Now the subloop comprising step 143 and inquiry points 144, 145, and 146 will be repeatedly executed until the next state change takes place, whereupon the control once again transfers to the Commutation Subroutine 151.

The above-described execution of the steps 143–146 and of the subroutines 151–154 are automatically repeated until the rotor is rotating faster than the aforesaid predetermined rate. Once this threshold speed is exceeded, the inquiring point 182 of the System Synch Subroutine (FIG. 11) yields an affirmative answer. In this event the control proceeds from point 182 to a step 183 that causes the controller to issue an appropriate signal that the engine is running. Step 183 is followed immediately by a step 184 that sets the cranking finish flag in an "on" state, and later by a step 185 that will cause the controller to command the opening of contactors K1p, K1n, K2 and K3. From step 185 the control returns to step 143 of the Normal Cranking Routine (FIG. 8). Now the step 143 and the inquiry points 144 and 145 are passed through again, and from the inquiry point 145 the control can proceed to a finish point 186 which marks the conclusion of the cranking mode of operation.

While a preferred embodiment of the invention has been shown and described by way of example, many modifications will undoubtedly occur to persons skilled in the art. The concluding claims are therefore intended to cover all such modifications as fall within the true spirit and scope of the invention.

We claim:

1. Means for precharging the commutation capacitor of a third harmonic auxiliary impulse commutated inverter in an electric power system comprising a pair of d-c terminals, means including an impedance that has appreciable electrical inductance for connecting said d-c terminals to a source of direct voltage the average magnitude of which normally does not exceed a predetermined amount, three a-c terminals adapted to be connected respectively to different phases of a 3-phase a-c inductive load circuit, at least three pairs of alternately conducting main controllable electric valves arranged in a 3-phase, double-way bridge configuration for interconnecting said d-c and a-c terminals, a commutation circuit including at least two auxiliary controllable electric valves interconnected in series aiding fashion between said d-c terminals and connected via a commutation capacitor to said load circuit, bistable means coupled to said capacitor for indicating whether the electrical potential on one side of the capacitor is measurably positive or negative with respect to the other side, and control means having a third harmonic commutation mode of operation in which periodic firing signals are cyclically produced, in a predetermined sequence and in synchronism with variable frequency alternating voltages developed at said a-c terminals, for causing said auxiliary valves to turn on alternately, at six times the fundamental frequency of said alternating voltages, and for turning on each of said main valves once per cycle, said control means also having a capacitor "ring-up" mode of operation which is achieved by the improvement comprising cyclically operative additional means coupled to said bistable means:

a. for initially generating a first pair of concurrent firing signals to turn on a first one of said auxiliary valves and a preselected complementary one of said main valves if said potential is relatively positive, or a second pair of concurrent firing signals to turn on the second auxiliary valve and another preselected complementary one of said main valves if said potential is negative, whereupon in either case a pulse of direct current flows from said source through a path comprising said impedance, said load circuit, and said capacitor to incrementally charge the capacitor with reverse polarity until current in said path oscillates to zero and the conducting valves consequently turn off; and b. thereafter, in delayed response to the start of the preceding cycle of operation, for repeatedly generating said second pair of firing signals if said potential is negative and said first pair of firing signals if said potential is positive;

c. said ring-up mode of operation continuing for a sufficient number of cycles to enable said capacitor to charge to a voltage magnitude many times higher than said predetermined amount.

2. The capacitor precharging means as in claim 1, in which said load circuit is the stator windings of a rotatable synchronous machine.

3. The capacitor precharging means as in claim 2, in which said source of direct voltage is an electric storage battery.

4. The capacitor precharging means as in claim 3, in which said impedance comprises the field winding of said machine.

5. The capacitor precharging means of claim 1, in which said source is an electric storage battery having a predetermined fully charged voltage rating.

6. A capacitor precharging means as in claim 5, in which said capacitor is charged to a voltage magnitude more than approximately five times higher than said battery voltage rating.

7. A capacitor precharging means as in claim 1, in which the Q of said path is approximately 6 or higher.

8. A capacitor precharging means as in claim 7, in which said capacitor is charged to a voltage magnitude more than approximately five times higher than said predetermined amount.

9. A capacitor precharging means as in claim 1, in which said additional means includes a timer effective to delay the start of each of its repeated cycles of operation for a predetermined interval of time.

10. A capacitor precharging means as in claim 9, in which said predetermined interval is approximately 10 milliseconds.

11. A capacitor precharging means as in claim 10, in which the Q of said path is approximately 6 or higher.

12. A capacitor precharging means as in claim 10, in which said additional means is arranged to execute its final cycle of operation a relatively short time after the magnitude of capacitor voltage attains a predetermined level.

13. A capacitor precharging means as in claim 1, in which voltage sensing means is coupled to said capacitor for detecting whether or not the capacitor voltage has a magnitude exceeding a predetermined level which is at least approximately five times higher than said predetermined amount, and said additional means stops generating firing signals in response to said voltage sensing means detecting that said capacitor has been charged to a voltage magnitude in excess of said predetermined level.

14. A capacitor precharging means as in claim 13, in which said additional means has a final cycle of operation after said voltage sensing means detects that the magnitude of capacitor voltage exceeds said predetermined level.

15. The capacitor precharging means as in claim 13, in which said source of direct voltage is an electric storage battery, said load circuit is star-connected stator windings of a rotatable synchronous machine, said capacitor is connected between the neutral of said stator windings and the juncture of said auxiliary valves, and said impedance comprises the field winding of said machine.

16. Improved means for precharging the commutation capacitor of a third harmonic auxiliary impulse commutated inverter in an electric power system comprising a pair of d-c terminals, means including an impedance that has appreciable electrical inductance for connecting said d-c terminals to a source of direct voltage the average magnitude of which normally does not exceed a predetermined amount, three a-c terminals adapted to be connected respectively to different phases of a 3-phase a-c inductive load circuit, at least three pairs of alternately conducting main controllable electric valves arranged in a 3-phase, double-way bridge configuration for interconnecting said d-c and a-c terminals, a commutation circuit including at least two auxiliary controllable electric valves interconnected in series aiding fashion between said d-c terminals and connected via a commutation capacitor to said load circuit, and control means having a third harmonic commutation mode of operation in which periodic firing signals are cyclically produced, in a predetermined sequence and in synchronism with variable frequency alternating voltages developed at said a-c terminals, for causing said auxiliary valves to turn on alternately, at six times the fundamental frequency qf said alternating voltages, and for turning on each of said main valves once per cycle, wherein the improvement comprises:

a. means effective prior to said control means being operated in said third harmonic commutation mode for assuring that said capacitor initially is in a substantially discharged state; and b. cyclically operative means associated with said control means for alternately generating a first pair of concurrent firing signals to turn on a first one of said auxiliary valves and a preselected complementary one of said main valves and a second pair of concurrent firing signals to turn on the second auxiliary valve and another preselected complementary one of said main valves, the generation of each of said first and second pairs of firing signals enabling a pulse of direct current to flow from said source through a path comprising said impedance, said load circuit, and said capacitor;

c. the interval of time between consecutive pairs of firing signals being sufficiently long to enable said current pulse to first discharge the capacitor and then incrementally recharge it with reverse polarity until current in said path oscillates to zero and the conducting valves consequently turn off;

d. said cyclically operative means continuing to generate firing signals for a sufficient number of cycles to charge said capacitor to a voltage magnitude many times higher than said predetermined amount.

17. The capacitor precharging means as in claim 16, in which said load circuit is the stator windings of a rotatable synchronous machine.

18. The capacitor precharging means as in claim 17, in which said source of direct voltage is an electric storage battery.

19. The capacitor precharging means as in claim 18, in which said impedance comprises the field winding of said machine.

* * * * *